(12) United States Patent
Kim et al.

(10) Patent No.: US 10,841,304 B2
(45) Date of Patent: Nov. 17, 2020

(54) DEVICE-TO-DEVICE COMMUNICATION METHOD INCLUDING DEVICE-TO-DEVICE AUTHENTICATION USING HASH CHAIN

(71) Applicant: SAMSUNG SDS CO., LTD., Seoul (KR)

(72) Inventors: Do Hyoung Kim, Seoul (KR); Soon Hyoung Hwang, Seoul (KR); Se Hyuk Noh, Seoul (KR); Nam Soo Jeon, Seoul (KR); Won Kyoung Kim, Seoul (KR); Jae Sung Jeong, Seoul (KR); Mi Ran Kim, Seoul (KR); Joo Hee Choi, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 182 days.

(21) Appl. No.: 16/052,074

(22) Filed: Aug. 1, 2018

(65) Prior Publication Data
US 2019/0098006 A1    Mar. 28, 2019

(30) Foreign Application Priority Data
Sep. 27, 2017 (KR) .................. 10-2017-0124853

(51) Int. Cl.
*H04L 29/06* (2006.01)
*H04L 9/06* (2006.01)
(Continued)

(52) U.S. Cl.
CPC ........ *H04L 63/0876* (2013.01); *H04L 9/0643* (2013.01); *H04L 9/088* (2013.01);
(Continued)

(58) Field of Classification Search
None
See application file for complete search history.

(56) References Cited

U.S. PATENT DOCUMENTS

| 8,984,602 | B1* | 3/2015 | Bailey | H04L 9/3242 |
|---|---|---|---|---|
| | | | | 726/6 |
| 2005/0038707 | A1* | 2/2005 | Roever | G06Q 20/12 |
| | | | | 705/21 |

(Continued)

FOREIGN PATENT DOCUMENTS

KR    10-2013-0057373 A    5/2013

*Primary Examiner* — William J. Goodchild
(74) *Attorney, Agent, or Firm* — Sughrue Mion, PLLC

(57) ABSTRACT

A device-to-device (D2D) communication method is provided. According to an inventive concept, the method comprises, storing, by a first device, first authentication data including a hash chain, which is a sequential concatenation of hash values, and storing, by a second device, second authentication data including an initial hash value of the hash chain, transmitting, by the first device, a final hash value of the hash chain to the second device, determining, by the second device, whether authentication between the first and second devices has succeeded by repeatedly hashing the initial hash value stored in the second device until a hash value identical to the final hash value is returned, and if a determination is made that authentication between the first and second devices has succeeded, performing, by the first and second devices, a connection establishment process for establishing a connection between the first and second devices.

10 Claims, 17 Drawing Sheets

(51) Int. Cl.
  *H04L 9/08* (2006.01)
  *H04W 12/06* (2009.01)
  *H04L 9/32* (2006.01)
  *H04L 9/12* (2006.01)
  *H04W 12/00* (2009.01)

(52) U.S. Cl.
  CPC .......... *H04L 9/0866* (2013.01); *H04L 9/0891* (2013.01); *H04L 9/12* (2013.01); *H04L 9/3226* (2013.01); *H04L 9/3239* (2013.01); *H04L 9/3273* (2013.01); *H04W 12/06* (2013.01); *H04L 2209/38* (2013.01); *H04L 2209/805* (2013.01); *H04L 2209/84* (2013.01); *H04W 12/003* (2019.01)

(56) References Cited

U.S. PATENT DOCUMENTS

| | | | | |
|---|---|---|---|---|
| 2005/0091545 | A1* | 4/2005 | Soppera | H04L 63/0823 726/19 |
| 2005/0114653 | A1* | 5/2005 | Sudia | H04L 9/3263 713/158 |
| 2005/0283444 | A1* | 12/2005 | Ekberg | G06Q 20/40 705/67 |
| 2007/0266244 | A1* | 11/2007 | Walker | H04L 63/0807 713/168 |
| 2009/0024848 | A1* | 1/2009 | Takasugi | H04L 9/3273 713/169 |
| 2019/0025817 | A1* | 1/2019 | Mattingly | H04L 9/0825 |

* cited by examiner

| Device ID | Device Attribute | MAC Address | Service Available Time |
|---|---|---|---|
| 550e8400-e29b-41d4-a716-446655440000 | First Public Garage, Seoul | 4F-A8-F0-4B-21-3A | 09:00 ~ 19:00 |
| ... | ... | ... | ... |

FIG. 4

DEVICE-TO-DEVICE COMMUNICATION METHOD INCLUDING DEVICE-TO-DEVICE AUTHENTICATION USING HASH CHAIN

This application claims priority to Korean Patent Application No. 10-2017-0124853, filed on Sep. 27, 2017, and all the benefits accruing therefrom under 35 U.S.C. § 119, the disclosure of which is incorporated herein by reference in its entirety.

BACKGROUND

1. Field

The present inventive concept relates to a device-to-device (D2D) communication method, and more particularly, to a D2D communication method in which D2D authentication is performed using a hash chain, a sequential concatenation of hash values, and then data is transmitted between devices.

2. Description of the Related Art

Various short-range wireless communication technologies such as Bluetooth, WiFi, Zigbee and Near Field Communication (NFC) are known. In order to transmit data between devices via short-range wireless communication, a connection establishment process needs to be performed first. For example, a pairing process is needed to transmit data between devices via Bluetooth.

A mutual authentication method that is fast and highly secure is required for the connection establishment process.

Meanwhile, various services can be provided based on device-to-device (D2D) short-range wireless communication. For example, a vehicle sharing service can support vehicle control based on short-range wireless communication between a user terminal such as a smartphone and a vehicle terminal installed in a user's vehicle. In this example, when the location where short-range wireless communication is to be performed is a communication shadow area, device authentication the transmission of data between each device and a service server is impossible. Thus, it is necessary to enable a connection establishment process to be performed for short-range wireless communication between devices that are relayed by the service server, even when a network connection to the service server cannot be established.

SUMMARY

Exemplary embodiments of the present inventive concept provide a device-to-device (D2D) communication method in which an authentication process for establishing a communication connection between devices is performed using a hash chain, a sequential concatenation of hash values, and a device and a service server therefor.

Exemplary embodiments of the present inventive concept also provide a D2D communication method in which a connection establishment process for short-range wireless communication between terminal devices that are relayed by the service server can be performed even when a network connection to the service server cannot be established, and a device and a service server therefor.

Exemplary embodiments of the present inventive concept also provide a D2D communication method in which a connection establishment process for short-range wireless communication between terminal devices that are relayed by the server can be automatically initiated, without a requirement of user input, when the terminal devices are approaching nearby, and a device and a service server therefor.

Exemplary embodiments of the present inventive concept also provide a D2D communication method in which a connection establishment process for short-range wireless communication between terminal devices that are relayed by a service server can be automatically initiated, without a requirement of user input, in response to the terminal devices being approaching nearby and the consumption of power for automatically initiating the connection establishment process can be reduced, and a terminal device therefor.

However, exemplary embodiments of the present inventive concept are not restricted to those set forth herein. The above and other exemplary embodiments of the present inventive concept will become more apparent to one of ordinary skill in the art to which the present inventive concept pertains by referencing the detailed description of the present inventive concept given below.

According to an exemplary embodiment of the present inventive concept, once a mutual authentication between first and second devices using a hash chain succeeds, a connection establishment process for establishing a connection between the first and second devices is automatically performed. The mutual authentication between the first and second devices may involve: i) storing, by the first device, first authentication data including a hash chain, which is a sequential concatenation of hash values, and storing, by the second device, second authentication data including an initial hash value of the hash chain; ii) transmitting, by the first device, a final hash value of the hash chain to the second device; and iii) determining, by the second device, whether authentication between the first and second devices has succeeded by repeatedly hashing the initial hash value stored in the second device until a hash value identical to the final hash value is returned.

According to another exemplary embodiment of the present inventive concept, a device-to-device (D2D) communication method is provided. The method comprises, storing, by a first device, first authentication data including a hash chain, which is a sequential concatenation of hash values, and storing, by a second device, second authentication data including an initial hash value of the hash chain, transmitting, by the first device, a final hash value of the hash chain to the second device, determining, by the second device, whether authentication between the first and second devices has succeeded by repeatedly hashing the initial hash value stored in the second device until a hash value identical to the final hash value is returned, and if a determination is made that authentication between the first and second devices has succeeded, performing, by the first and second devices, a connection establishment process for establishing a connection between the first and second devices.

Other features and exemplary embodiments may be apparent from the following detailed description, the drawings, and the claims.

BRIEF DESCRIPTION OF THE DRAWINGS

The above and other exemplary embodiments and features of the present inventive concept will become more apparent by describing in detail exemplary embodiments thereof with reference to the attached drawings, in which:

FIG. 4 is a schematic view illustrating the configuration of data regarding second devices, according to some exemplary embodiments of the present inventive concept;

DETAILED DESCRIPTION

Figure 1:
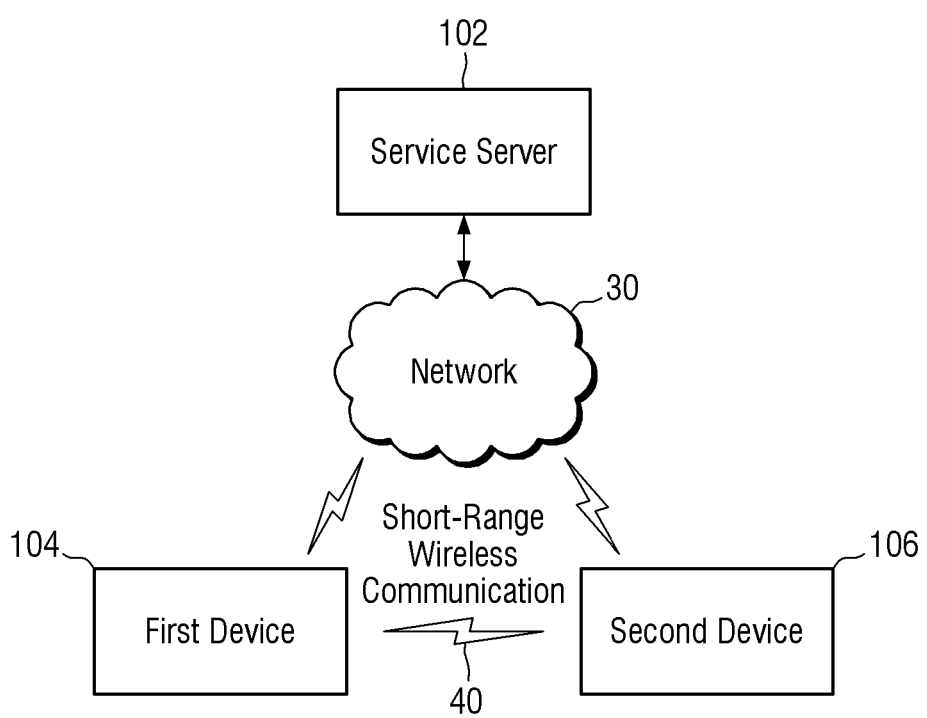
FIG. 1 is a configuration view of a device-to-device (D2D) short-range wireless communication service providing system according to an exemplary embodiment of the present inventive concept.

Exemplary embodiments of the present inventive concept will hereinafter be described with reference to the accompanying drawings.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The configuration and operations of a device-to-device (D2D) communication service providing system according to an exemplary embodiment of the present inventive concept will hereinafter be described with reference to FIGS. 1 and 2. FIG. 1 is a configuration view of a D2D short-range communication service providing system according to an exemplary embodiment of the present inventive concept. The D2D short-range communication service providing system provides various types of D2D communications. For example, D2D communications such as wired communication, mobile communication (e.g., 3G, 4G, 5G, or the like), and short-range wireless communication (e.g., Bluetooth, WiFi, NFC, or the like) can be provided. In some exemplary embodiments, in a case where a short-range wireless communication 40 is provided between devices, a D2D communication service can be provided without a connection to an external device such as a service server 102 or to a public network such as a network 30, and this is highly effective in terms of usability. For a better understanding, the present inventive concept will hereinafter be described taking a D2D short-range wireless communication method as an example. However, the present inventive concept should not be construed as limited to D2D short-range wireless communication.

Referring to FIG. 1, the D2D communication service providing system includes a first device 104, which includes a short-range wireless communication interface, a second device 106, which also includes a short-range wireless communication interface, and the service server 102. In order that only an authorized short-range wireless communication can be conducted, the first and second devices 104 and 106 establish a connection for short-range wireless communication through authentication. Once a connection is properly established between the first and second devices 104 and 106, the first and second devices 104 and 106 can transmit data to, or receive data from, each other in a peer-to-peer (P2P) manner via short-range wireless communication.

The service server 102 provides the first and second devices 104 and 106 with authentication data for use in authentication for establishing a connection between the first and second devices 104 and 106. The authentication data will be described later with reference to FIG. 3.

In response to a reservation request being received from the first device 104, the service server 102 selects one of a plurality of devices, which are management targets, e.g., the second device 106, as a reservation target, transmits first authentication data to the first device 104 via the network 30, and transmits second authentication data to the second device 106 via the network 30.

The first device 104 stores the first authentication data. The second device 106 also stores the second authentication data.

In one exemplary embodiment, the first and second devices 104 and 106 perform a mutual authentication process using a hash chain, which is a sequential concatenation of hash values. In this exemplary embodiment, the first authentication data may include the hash chain, and the second authentication data may include an initial hash value of the hash chain. The mutual authentication process includes: storing, by the first device 104, the first authentication data, which includes the hash chain, and storing, by the second device 106, the second authentication data, which includes the initial hash value of the hash chain; transmitting, by the first device 104, a final hash value of the hash chain to the second device 106; determining, by the second device 106, whether authentication performed between the first and second devices 104 and 106 has been successful by repeatedly hashing the initial hash value stored in the second device 106 until a hash value identical to the final hash value of the hash chain is returned; performing, by the first and second devices 104 and 106, authentication using the first authentication data and the second authentication data if a requirement to perform a connection establishment process for short-range wireless communication between the first and second devices 104 and 106 is met. The first authentication data further includes a maximum count, and the final hash value of the hash chain may be one of the hash values of the hash chain that offsets the maximum count. The transmission of the final hash value of the hash chain to the second device 106 involves transmitting the maximum count to the second device 106 together with the final hash value of the hash chain, and the determination of success in the authentication between the first and second devices 104 and 106 involves repeatedly hashing the initial hash value stored in the second device 106 until a hash value identical to the final hash value of the hash chain is returned, and if the hash value identical to the final hash value of the hash chain is not returned until the number of times the initial hash value stored in the second device 106 is hashed reaches the maximum count, determining that the authentication between the first and second devices 104 and 106 has failed.

The determination that the authentication between the first and second devices 104 and 106 has failed does not necessarily mean that the authentication between the first and second devices 104 and 106 cannot be performed again. That is, the authentication between the first and second devices 104 and 106 can be performed again after lowering the maximum count. For example, if a final hash value corresponding to $H^{100}$ is not returned by a repeated hashing operation performed by the second device 106 when the maximum count is 100, the maximum count is lowered to 99, and then, an attempt is made to induce, by a repeated hashing operation performed by the second device 106, a final hash value corresponding to $H^{99}$. A mutual authentication between devices using a hash chain will be described later in further detail with reference to FIGS. 10 through 17.

The requirement to perform the connection establishment process for short-range wireless communication between the first and second devices 104 and 106 may refer to whether location information of the first device 104 matches information included in the reservation request, whether the current time matches validity period information included in the reservation request, or both.

Since authentication data for performing the authentication between the first and second devices 104 and 106 is already downloaded from the service server 102 to the first and second devices 104 and 106, the first and second devices 104 and 106 do not need to be connected to the service server 102. Thus, even if the first and second devices 104 and 106 are located in a communication shadow area at the time of the establishment of a short-range wireless communication connection between the first and second devices 104 and 106, the authentication between the first and second devices 104 and 106 can be properly performed, and as a result, a short-range wireless communication connection can be properly established. Also, since the amount of time that it takes to connect the first and second devices 104 and 106 can be saved during the authentication between the first and second devices 104 and 106, the amount of time that it takes to transmit data between the first and second devices 104 and 106 can be reduced.

For a better understanding, it is assumed that the first device 104 is a device used by a user and the second device 106 is a device performing the short-range wireless communication 40 with the first device 104. As already mentioned above, the reservation request is transmitted by the first device 104. The establishment of a short-range wireless communication connection between the first and second devices 104 and 106 does not require user input for the first device 104. That is, the user of the first device 104 is simply required to transmit the reservation request to the service server 102 and to bring the first device 104 close to the second device 106. Then, a short-range wireless communication connection is automatically established between the first and second devices 104 and 106.

For example, if the second device 106 is a device to be controlled by the first device 104, the user of the first device 104 can control the second device 106 with the first device 104, without a requirement of an additional procedure, simply by transmitting a reservation request for the second device 106 to the service server 102 and bringing the first device 104 close to the second device 106. Even if the first and second devices 104 and 106 are located in a communication shadow area, authentication for establishing a short-range wireless communication connection between the first and second devices 104 and 106 can be properly performed as long as the first and second devices 104 and 106 are connected to the service server 102 at the time of the transmission of the reservation request, because authentication data for performing authentication for establishing a short-range wireless communication connection between the first and second devices 104 and 106 can already be downloaded into the first and second devices 104 and 106 at the time of the transmission of the reservation request.

Figure 2:
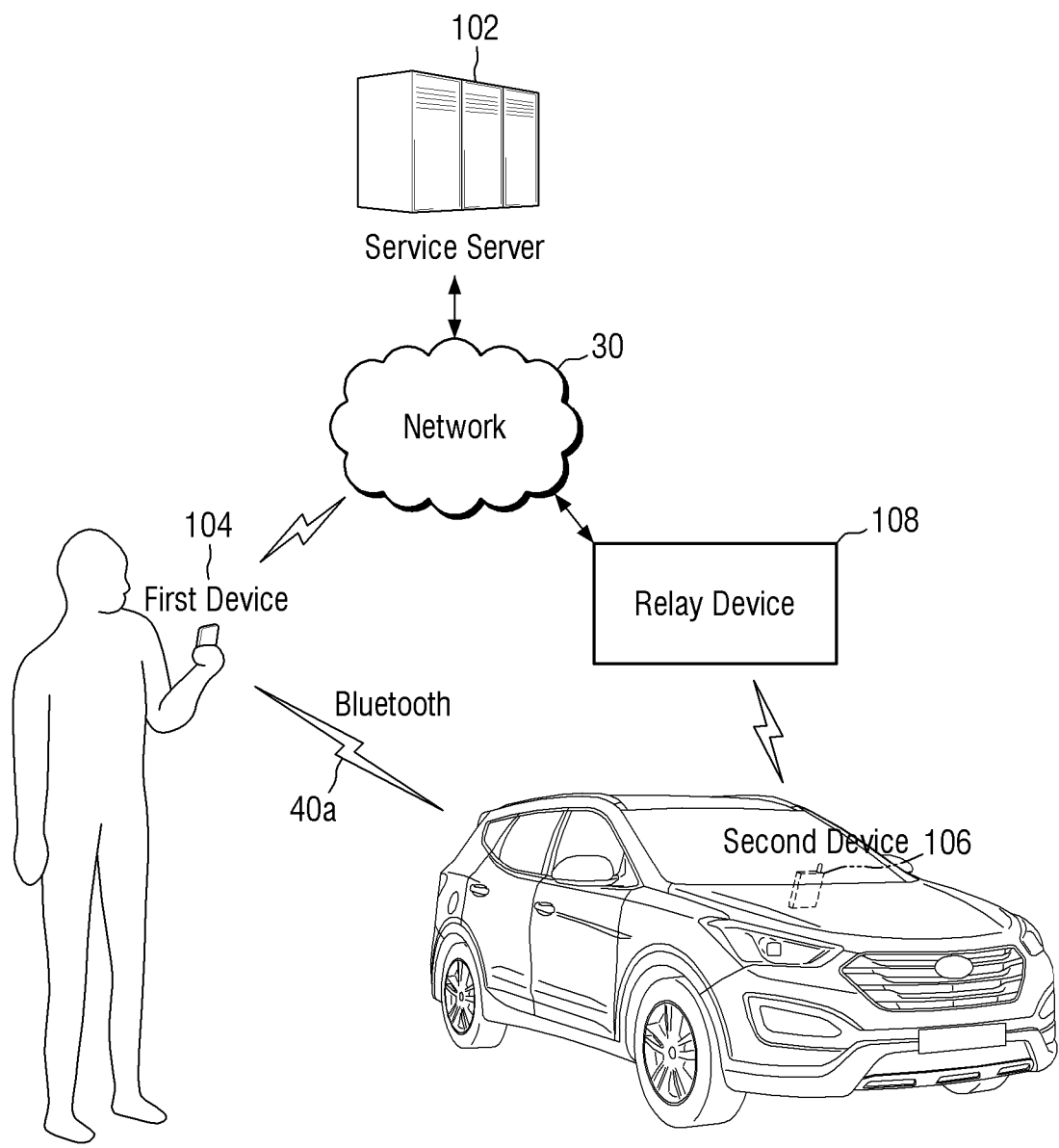
FIG. 2 is a configuration view of a D2D short-range wireless communication service providing system according to another exemplary embodiment of the present inventive concept.

FIG. 2 is a configuration view of a D2D short-range wireless communication service providing system according to another exemplary embodiment of the present inventive concept in a case where the second device 106 is a device to be controlled by the first device 104. Referring to FIG. 2, the D2D short-range wireless communication service providing system supports a vehicle to be controlled by control signals provided from the first device 104 to the second device 106 via Bluetooth 40*a*. FIG. 2 illustrates an example in which Bluetooth is used for short-range wireless communication between the first and second devices 104 and 106.

As already mentioned above, the first and second devices 104 and 106 do not need to be connected to the service server 102 at the time of establishing a short-range wireless communication connection between the first and second devices 104 and 106 (i.e., at the time of pairing). However, a relay device 108 may be included in the D2D short-range wireless communication service providing system in case the second device 106 and the network 30 cannot be directly connected because a vehicle having the second device 106 is in a communication shadow area or because the second device 106 is not equipped with a mobile communication interface (e.g., a network module supporting LTE- or 5G mobile communication-based data communication) for cost reasons.

For example, the relay device 108 may be an access point (AP) allowing the second device 106 to be connected to the network 30 via WiFi. In this example, the second device 106 may be equipped with a WiFi module. The relay device 108 may receive data from the service server 102, may convert the received data to a format that can be received by the second device 106, and may transmit the converted data to the service server 102. Here, the relay device 108 has been described above as mediating the transmission of data between the service server 102 and the second device 106, but the present inventive concept is not limited thereto. That is, alternatively, the service server 102 and the second device 106 can transmit data directly to, or receive data directly from, each other without the relay device 108.

Figure 3:
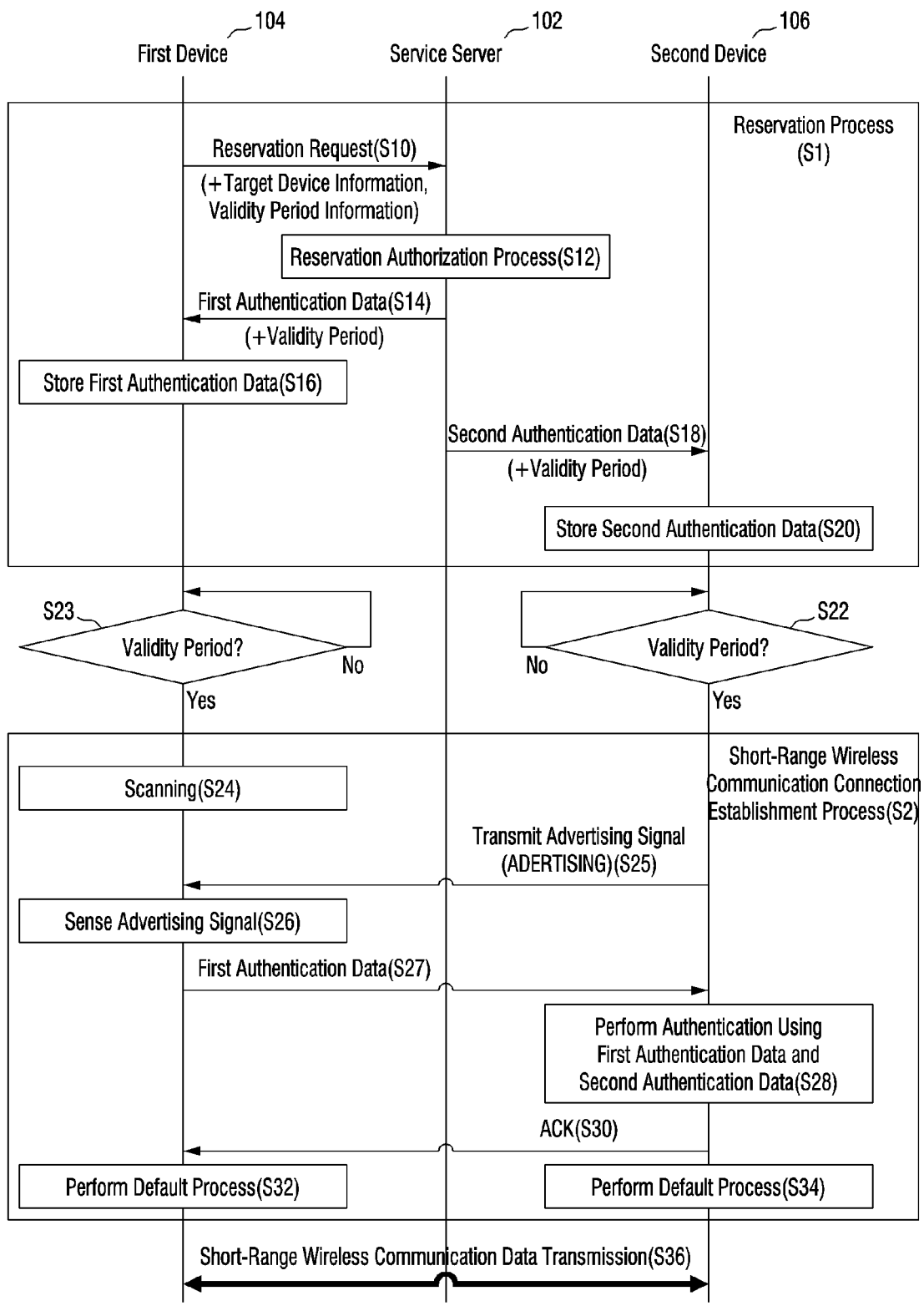
FIG. 3 is a signal flowchart illustrating a D2D communication method according to an exemplary embodiment of the present inventive concept.

A D2D communication method according to an exemplary embodiment of the present inventive concept will hereinafter be described with reference to FIG. 3. FIG. 3 is a signal flowchart illustrating a D2D communication method according to an exemplary embodiment of the present inventive concept.

First, it will hereinafter be described how the service server 102 manages information regarding a plurality of second devices. FIG. 4 illustrates the configuration of data 50 regarding each of the plurality of second devices, according to some exemplary embodiments of the present inventive concept. Referring to FIG. 4, the service server 102 manages device identifiers (IDs) 51 of, and additional device information regarding, the plurality of second devices. The additional device information includes at least one field selected from among a device attribute field 52, a media access control (MAC) address field 53, and a service available time field 54.

The device IDs 51 may be, for example, universally unique identifier (UUID) data by which the plurality of second devices can be identified.

Also, the device attribute field 52 includes information regarding each of the plurality of second devices such as location information and model information. The service server 102 compares information regarding a requirement for a desired device to be reserved, included in a reservation request received from the first device 104, with information included in the device attribute field 52 and selects a second device 106 that meets the requirement for the desired device based on the result of the comparison. Additionally, a service available time may be defined for each of the plurality of second devices. That is, the plurality of second devices can transmit data to, or receive data from, the first device 104 only during their respective service available times, and during other times, the short-range wireless communication function of the plurality of second devices can be inactivated, or the plurality of second devices can be turned off. Accordingly, the requirement for the desired device may preferably be selected from among information included in the device attribute field 52 and information included in the service available time field 54. In one exemplary embodiment, the MAC addresses of the plurality of second devices may be included in first authentication data transmitted to the first device 104. This will be described later in detail.

Referring to FIG. 3, the first device 104 transmits a reservation request to the service server 102 (S10). The reservation request may include information regarding a requirement for a desired second device 106 that the first device 104 wishes to wirelessly communicate with and validity period information indicating a validity period during which the first device 104 wishes to wirelessly communicate with the desired second device 106. As already mentioned above with reference to FIG. 4, the requirement for the desired second device 106 may be compared with the information included in each of the device attribute field 52 and the service available time field 54 of the data 50 regarding each of the plurality of second devices.

The service server 102 receives the reservation request and executes a reservation authorization process (S12). The reservation authorization process involves selecting one of the plurality of second devices using the information included in the reservation request and generating first authentication data to be transmitted to the first device 104 and second authentication data to be transmitted to the selected second device, i.e., a second device 106. The second authentication data corresponds to the first authentication data.

In one exemplary embodiment, the first authentication data includes a hash chain, which is a sequential concatenation of hash values.

The hash chain includes, and sequentially concatenates, a first hash value returned by inputting a token to a hash function, a second hash value returned by inputting the first hash value to the hash function, a third hash value returned by inputting the second hash value to the hash function, and a fourth hash value returned by inputting the third hash value to the hash function. The hash chain may further include fifth through N-th hash values (where N is a natural number of 6 or greater) generated in the same manner as the second through fourth hash values. The service server 102 may regenerate the token periodically or non-periodically.

The second authentication data includes an initial hash value of the hash chain. Since the first authentication data includes the hash chain and the second authentication data includes the initial hash value of the hash chain, i.e., the first hash value, the second authentication data corresponds to the first authentication data because the first authentication. The first authentication data may further include the MAC address of the second device 106.

If the result of the reservation authorization process shows that none of the plurality of second devices 106 are available for reservation, the service server 102 may transmit a reservation failure message to the first device 104.

The service server 102 transmits the first authentication data and validity period information included in the reservation request to the first device 104 (S14), and the first device 104 stores the first authentication data and the validity period information (S16). The service server 102 transmits the second authentication data and the validity period information to the second device 106 (S18), and the second device 106 stores the second authentication data and the validity period information (S20).

A reservation process 51 has been described so far. Since the reservation request needs to be transmitted to the service server 102 and the first authentication data and the second authentication data need to be transmitted by the service server 102 to the first and second devices 104 and 106, the first and second devices 104 and 106 need to be connected to the service server 102 during the reservation process 51.

As already mentioned above, the service server 102 transmits the validity period information to the first and second devices 104 and 106 together with the first or second authentication data. Since the first and second devices 104 and 106 do not activate a short-range wireless communication connection establishment process S2 during times other than a predetermined validity period, the power consumption of the first and second devices 104 and 106 can be reduced.

Obviously, in one exemplary embodiment, at least one of the first and second devices 104 and 106 may be able to sense signals received from the other device, even during a non-validity period, to perform the short-range wireless communication connection establishment process S2.

An exemplary embodiment in which the first and second devices 104 and 106 do not activate the short-range wireless communication connection establishment process S2 during a non-validity period will hereinafter be described. In response to the validity period information being received from the service server 102 together with the second authentication data, the second device 106 determines whether the predetermined validity period has arrived (S22) and transmits an advertising signal ADVERTISING via short-range wireless communication (S25) if a determination is made that the predetermined validity period has arrived. Similarly, in response to the validity period information being received from the service server 102 together with the first authentication data, the first device 104 determines whether the predetermined validity period has arrived (S23) and starts to scan the advertising signal ADVERTISING transmitted by the second device 106 (S24).

In response to the advertising signal ADVERTISING being sensed from the second device 106 (S26), the first device 104 transmits the first authentication data to the second device 106 via short-range wireless communication (S27).

As already mentioned above, in one exemplary embodiment, the first authentication data may include the MAC address of the second device 106. In one exemplary embodiment, the advertising signal ADVERTISING may include the MAC address of the second device 106. The first device 104 may perform authentication by comparing the MAC address included in the advertising signal ADVERTISING and the MAC address included in the first authentication data. Then, the first device 104 transmits one of a plurality of hash values included in the hash chain to the second device 106 (S27) only if the MAC address included in the advertising signal ADVERTISING and the MAC address included in the first authentication data are the same.

The second device 106 may authenticate the first device 104 by using the first authentication data and the second authentication data. Specifically, the second device 106 may authenticate the first device 104 (S28) depending on whether the hash value transmitted by the first device 104 can be obtained by repeatedly inputting the initial hash value stored in the second device 106 to the hash function. The second device 106 may transmit an acknowledgement signal ACK to the first device 104 if the authentication of the first device 104 succeeds.

In one exemplary embodiment, the short-range wireless communication connection establishment process S2 is a process for establishing a Bluetooth session, and the signal transmitted by the first device 104 to the second device 106 in S27 may be a Bluetooth pairing request signal.

In one exemplary embodiment, if the establishment of a short-range wireless communication connection between the first and second devices 104 and 106 succeeds, a default process defined in at least one of the first and second devices 104 and 106 may be performed without a requirement of user input (S32 and S34). For example, as illustrated in FIG. 2, if the D2D communication method is performed as part of a vehicle sharing service, the second device 106 may transmit a control signal to a door controller for controlling the doors of a vehicle as a default process (S34), and the first device 104 may execute a D2D short-range wireless communication-based vehicle control application as a default process (S32).

In one exemplary embodiment, the second device 106 may be a digital door lock, and the default process performed in S34 may be opening the digital door lock.

In one exemplary embodiment, the second device 106 may be a door lock at the front door of an apartment, and the default process performed in S34 may be opening the door lock and sending a notification message to the user of the first device 104.

After the short-range wireless communication connection establishment process S2, the transmission of data via short-range wireless communication is performed between the first and second devices 104 and 106 (S36).

Figure 5:
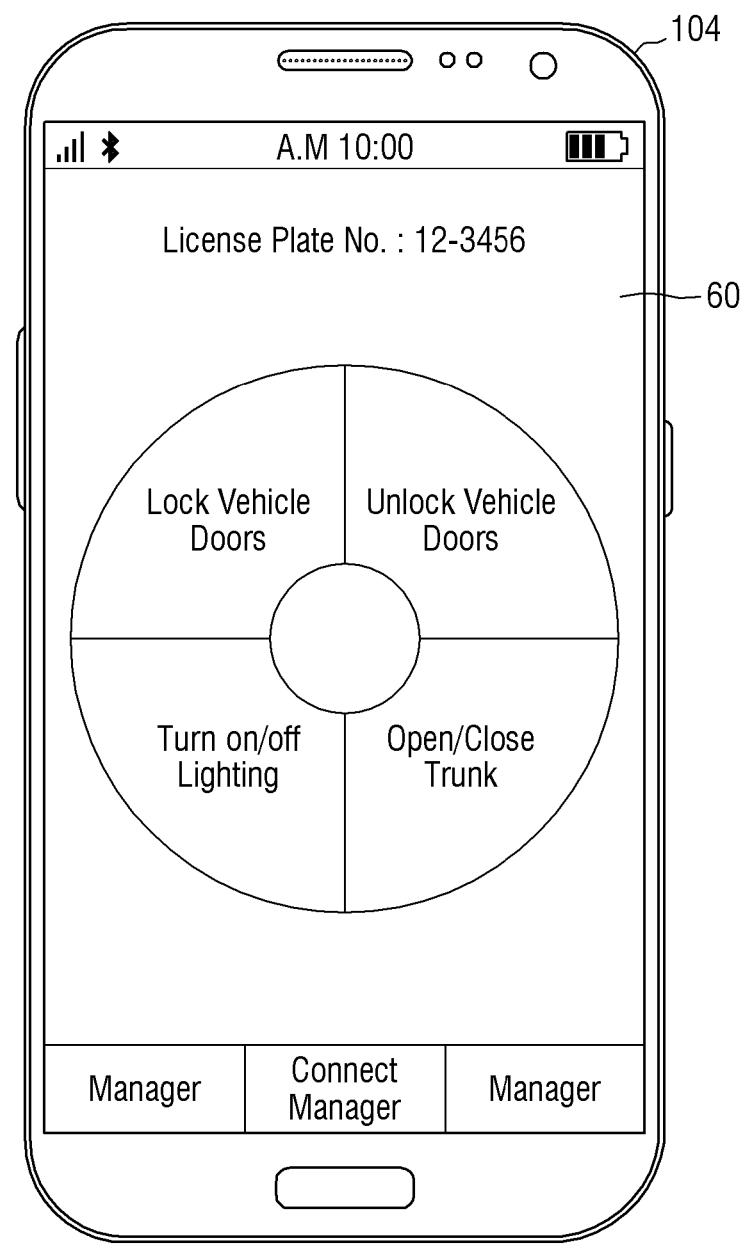
FIG. 5 is a schematic view illustrating an exemplary screen that can be displayed on a user terminal when a process for establishing a connection for D2D short-range wireless communication succeeds, according to some exemplary embodiments of the present inventive concept.

FIG. 5 is a schematic view illustrating an exemplary screen that can be displayed on a user terminal when a process for establishing a connection for D2D short-range wireless communication succeeds, according to some exemplary embodiments of the present inventive concept. Referring to FIG. 5, the first device 104 may execute a vehicle control application 60 that is based on D2D short-range wireless communication and may display a screen of the vehicle control application 60. The vehicle control application 60 may include various buttons for generating commands for controlling a vehicle via the second device 106.

For example, if the user of the first device 104 selects one of the buttons, a command corresponding to the selected button is transmitted via a short-range wireless communication connection between the first and second devices 104 and 106.

The functional aspects of the service server 102 will hereinafter be described.

The service server 102 is a device for generating and managing a key token for D2D communication between the first and second devices 104 and 106. The key token may be a type of smart key used for one of the first and second devices 104 and 106 to authenticate the other device and execute a command (e.g., unlocking a door lock, opening/closing the doors of a vehicle, and starting/turning off a vehicle) in accordance with a predefined policy. The key token may be generated based on information regarding the first device 104, information regarding the second device 106, the ID of an input policy, and a user ID.

The service server 102 may receive the input policy from a legacy system (not illustrated) and may generate the key token in accordance with the input policy. The legacy system, which is a system providing various services to a user in cooperation with the service server 102, may provide the service server 102 with at least one of a plurality of predefined policies corresponding to a request from the user as the input policy. In one example, the service server 102 may receive a policy for automatically unlocking a door lock upon being approached by the user from a home network system (not illustrated) as the input policy. In another example, in a case where the user makes a reservation for a vehicle, the service server 102 may receive a policy for remote-controlling the opening/closing of the doors of the vehicle or the starting/turning off of the vehicle in accordance with user input during a reservation period for which the vehicle is reserved by the user from a vehicle sharing system (not illustrated) as the input policy. The key token may have a validity period (e.g., five days), and the validity period may vary depending on the input policy (e.g., the reservation period). As will be described later, the second device 106 may receive information regarding the validity period from the service server 102 and may be able to authenticate the first device 104, and execute a command, only during the validity period.

Also, the service server 102 may store and manage information regarding the user, information regarding a device possessed by the user (e.g., model information and ID information), information regarding a device to be controlled (e.g., model information, ID information, and controllable command information), information regarding policies that can be input, information regarding the key token, information regarding the validity period (e.g., the start time and end time of the validity period), and hash code in a database.

Also, the service server 102 generates hash code using the key token and transmits the generated hash code to the first and second devices 104 and 106. Specifically, the service server 102 may generate a plurality of first hash values by repeatedly hashing the key token (or an initial hash value of the key token) a number of times corresponding to a maximum count. Also, the service server 102 may generate a hash chain of the first hash values by concatenating the first hash values in order of the number of times a hash function has been applied (or in order of generation). The maximum count is the number of first hash values sequentially concatenated and may vary depending on the input policy and the validity period of the key token. In one example, when the user makes a reservation for a vehicle for a period of five days, the validity period of the key token may be five days, and the maximum count may be 100. In another example, when the user makes a reservation for a vehicle for a period of three days, the validity period of the key token may be three days, and the maximum count may be 50. An example of generated hash chain the first hash values may be as follows:

$$H^1(T)\text{-}H^2(T)\text{-}H^3(T) \ldots H^{99}(T)\text{-}H^{100}(T) \text{ (Maximum Count=100)}$$

where $H^1(T)$ denotes a hash value obtained by applying a hash function to the key token (or the initial hash value of the key token) once, $H^2(T)$ denotes a hash value obtained by applying the hash function to the key token (or the initial hash value of the key token) twice, . . . , $H^{100}(T)$ denotes a hash value obtained by applying the hash function to the key token (or the initial hash value of the key token) 100 times, and T denotes the key token. That is, $H^N(T)$ may be a hash value obtained by inputting the key token T or the initial hash value of the key token T to the hash function N times. The hash value $H^N(T)$ may be used as a disposable key for D2D communication between the first and second devices 104 and 106 in an environment where it is difficult to synchronize the first and second devices 104 and 106 with each other without the aid of the service server 102.

The service server 102 may transmit the first hash values to the first device 104. The service server 102 may transmit the input policy, information regarding the maximum count, and the information regarding the validity period of the key token to the first device 104 along with the first hash values.

Also, the service server 102 may transmit the information regarding the key token, the information regarding the maximum count, the input policy, and the information regarding the validity period of the key token to the second device 106. The information regarding the key token may include the key token or a hash value obtained by hashing the key token a predefined number of times. The hash value obtained by hashing the key token the predefined number of times may be, for example, the initial hash value of the key token. In the description that follows, it is assumed that the information regarding the key token is the initial hash value of the key token. The service server 102 may transmit the information regarding the key token, the information regarding the maximum count, the input policy, and the information regarding the validity period of the key token to the second device 106 via the relay device 108. Since a communication channel between the service server 102 and the second device 106 may be less secure than a communication channel between the service server 102 and the first device 104, the service server 102 transmits the maximum count and only the initial hash value of the key token to the second device 106, instead of transmitting all the first hash values obtained from the key token, i.e., $H^1(T)\text{-}H^2(T)\text{-}H^3(T) \ldots H^{99}(T)\text{-}H^{100}(T)$, to the second device 106. As will be described later, the second device 106 may receive one of the first hash values from the first device 104 and may authenticate the first device 104 based on the received first hash value and the initial hash value and the maximum account, received from the service server 102.

Also, the service server 102 may synchronize hash chains stored in the first and second devices 104 and 106 using the maximum count for each of the first and second devices 104 and 106.

Also, the service server 102 may update at least one of the key token and the maximum count in consideration of at least one of the validity period of the key token, the maximum count for the first device 104 (or the number of first hash values stored in the first device 104), and the policy input to the service server 102.

Also, the service server 102 may discard the key token depending on whether the validity period of the key token or the input policy expires. The generation of the key token, the synchronization of the hash chains stored in the first and second devices 104 and 106, and the update and discardment of the key token will be described later with reference to FIGS. 10 through 12. For convenience, the maximum count stored in the first device 104 will hereinafter be referred to as a first maximum count, and the maximum count stored in the second device 106 will hereinafter be referred to as a second maximum count. The first and second maximum counts may initially be generated by the service server 102 and may be distributed to the first and second devices 104 and 106, respectively, but the present inventive concept is not limited thereto. As will be described later, the first device 104 may transmit a first hash value corresponding to the first maximum count to the second device 106 and may lower the first maximum count by one whenever each first hash value is transmitted to the second device 106. The second device 106 may lower the second maximum count to N if a second hash value obtained by hashing the initial hash value N times is identical to a first hash value received from the first device 104.

The first device 104, which is a device used to control the operation of the second device 106 via D2D communication with the second device 106, may be, for example, a smartphone, a tablet PC, or a wearable device such as a smart watch. The first device 104 may be a mobile device that can be carried by the user. The first device 104 may be equipped with a security-related application and may perform, via the security-related application, various functions that will hereinafter be described.

As already mentioned above, the first device 104 may receive a hash chain, which is a sequential concatenation of first hash values (e.g., $H^1(T)\text{-}H^2(T)\text{-}H^3(T) \ldots H^{99}(T)\text{-}H^{100}(T)$), the policy input to the service server 102, the first maximum count, and the information regarding the validity period of the key token from the service server 102. The first device 104 may encrypt the first hash values, the input policy, the first maximum count, and the information regarding the key token and may store the results of the encryption in an internal security zone (e.g., a storage).

Thereafter, the first device 104 may transmit one of the first hash values of the hash chain corresponding to the first maximum count to the second device 106 for D2D communication with the second device 106 and may lower the first maximum count by one whenever each of the first hash values of the hash chain is transmitted to the second device 106. In one example, the first device 104 may transmit a final first hash value of the hash chain to the second device 106 first and may then transmit a first hash value previous to the final first hash value to the second device 106. In this example, the first device 104 may sequentially transmit the first hash values of the hash chain to the second device 106 in the order of $H^{100}(T)$, $H^{99}(T)$, $H^{98}(T)$, . . . and may lower the first maximum count by one from 100 to 99, to 98, to 97, . . . , whenever each of the first hash values of the hash chain is transmitted to the second device 106. The first device 104 may exhaust the first hash values of the hash chain one by one from the end of the hash chain whenever an attempt is made to communicate with the second device 106, and as a result, the first maximum count may be lowered by one.

If the first maximum count (or the number of first hash values of the hash chain) becomes less than or equal to a set value of, for example, 1, when a set period or longer is left to the expiration of the validity period of the key token, the first device 104 may issue a request for the update of the key token and the first maximum count. In one example, if the first maximum count becomes one when the validity period of the key token ranges from May 1 to May 10 and five days or more are left to the expiration of the validity period of the key token from a current date of, for example, May 3, the first device 104 may issue a request for the update of the key token and the first maximum count to the service server 102. In this example, the service server 102 may update the key token and the first maximum count in response to the receipt of the request and may transmit new first hash values generated from the updated key token and the updated first maximum count, a hash chain obtained by sequentially concatenating the new first hash values, and information regarding the updated first maximum count to the first device 104.

On the other hand, if the first maximum count becomes equal to, or less than, the set value of, for example, 1 (or the first hash values of the hash chain are all exhausted), when the set period or shorter is left to the expiration of the validity period of the key token, or if the validity period expires, the first device 104 may issue a request for the discardment of the key token. In one example, if the first maximum count becomes one when the validity period of the key token ranges from May 1 to May 10 and two days or less are left to the expiration of the validity period of the key token from a current date of, for example, May 9, the first device 104 may issue a request for the discardment of the key token to the service server 102. In this example, the service server 102 may issue a request for the discardment of existing hash code (or an existing hash chain) to each of the first and second devices 104 and 106 and may discard the key token stored in the service server 102 if the existing hash code is discarded from each of the first and second devices 104 and 106.

The second device 106, which is a device to be controlled, may be, for example, an Internet of Things (IoT) device such as a door lock, a vehicle, a sensor lighting, or the like or a security module embedded in the IoT device.

As already mentioned above, the second device 106 may receive the initial hash value of the key token, information regarding the second maximum count, the policy input to the service server 102, the information regarding the validity period of the key token from the service server 102. Specifically, the second device 106 may receive the initial hash value of the key token, the information regarding the second maximum count, the policy input to the service server 102, the information regarding the validity period of the key token from the service server 102 via the relay device 108. The second device may store the initial hash value of the key token, the information regarding the second maximum count, the policy input to the service server 102, the information regarding the validity period of the key token in an internal security zone (e.g., a storage).

Also, the second device 106 may receive one of the first hash values of the hash chain from the first device 104. As already mentioned above, the first device 104 may transmit one of the first hash values of the hash chain corresponding to a current first maximum count to the second device 106. In response to the receipt of the first hash value transmitted by the first device 104, the second device 106 may authenticate the first device 104 based on the received first hash value and the initial hash value and the information regarding the second maximum count, received from the service server 102.

Specifically, the second device 106 may authenticate the first device 104 by comparing second hash values, which are obtained by repeatedly hashing the initial hash value as many times as the second maximum count or less until a second hash value identical to the received first hash value is returned, with the received first hash value. The second device 106 may generate the second hash values using the same hash function as that used in the service server 102. In one example, the second device 106 may compare a second hash value obtained by applying the hash function once to the initial hash value with the received first hash value. Then, if the second hash value obtained by applying the hash function once to the initial hash value is not identical to the received first hash value, the second device 106 may compare a second hash value obtained by applying the hash function twice to the initial hash value with the received first hash value. In this manner, the second device 106 may generate multiple second hash values by repeatedly hashing the initial hash value as many times as the second maximum count or less until a second hash value identical to the received first hash value is returned, and may compare the multiple second hash values with the received first hash value.

If a second hash value identical to the received first hash value is returned, the second device 106 may determine that the authentication of the first device 104 is complete.

Then, the second device 106 may lower the second maximum count based on the returned second hash value. Specifically, if a second hash value obtained by hashing the initial hash value N times is identical to the received first hash value, the second device 106 may lower the second maximum count to N. Here, N<Second Maximum Count. For example, if a second hash value obtained by hashing the initial hash value 50 times is identical to the received first hash value, the second device 106 may lower the second maximum count to 50. Therefore, even if the first and second devices 104 and 106 currently have different maximum counts, the second device still can authenticate the first device 104.

Figure 6:
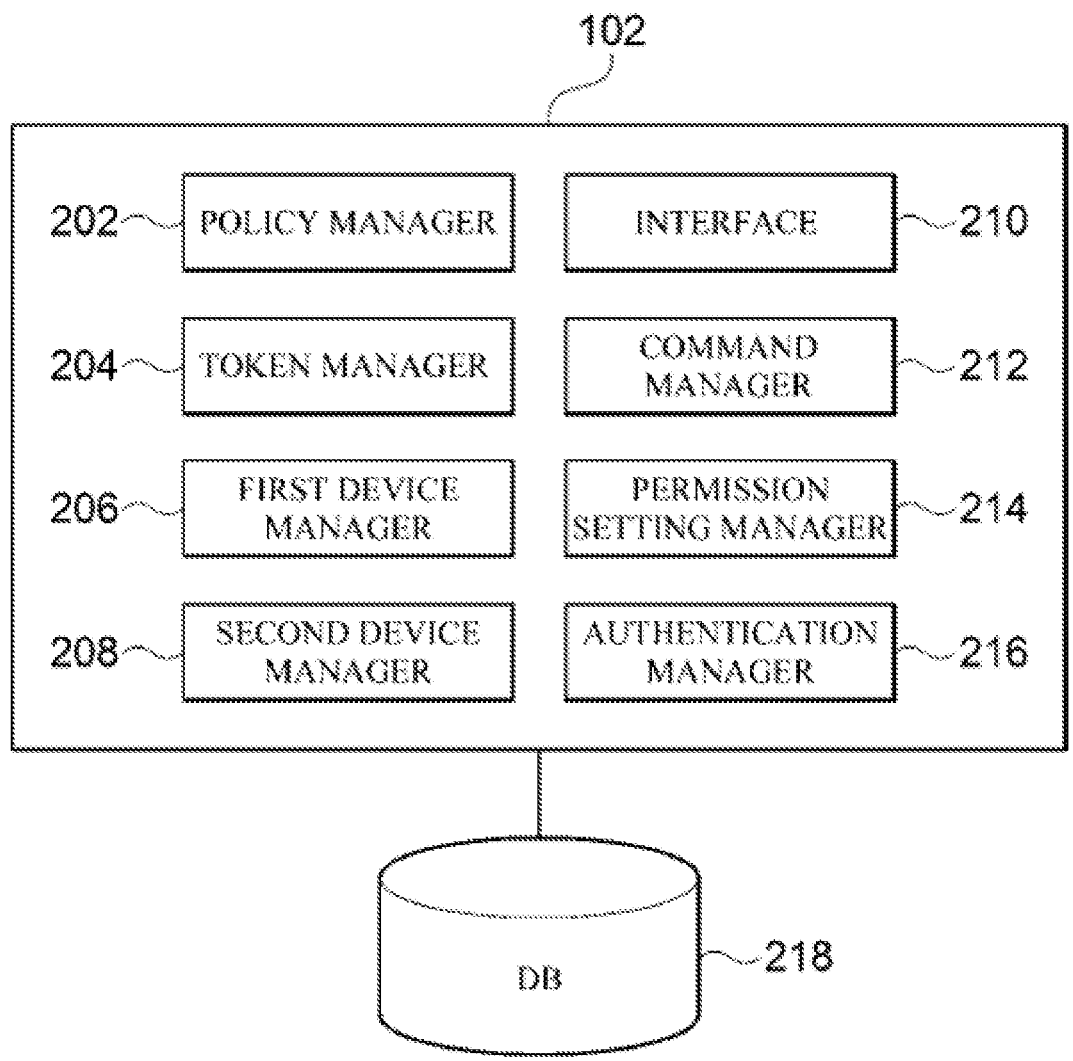
FIG. 6 is a block diagram illustrating a detailed configuration of a server according to an exemplary embodiment of the present inventive concept.

FIG. 6 is a block diagram illustrating a detailed configuration of the server 102 according to an exemplary embodiment of the present inventive concept. As shown in FIG. 6, the server 102 includes a policy manager 202, a token manager 204, a first device manager 206, a second device manager 208, an interface 210, a command manager 212, a permission setting manager 214, and an authentication manager 210, and may be connected to a database 210 according to an embodiment.

The policy manager 202 receives a policy from a legacy system (not shown). In addition, the policy manager 202 may manage identification code for each policy and each time a policy is input, the policy manager 202 may identify the policy by checking the identification code of the input policy. In addition, the policy manager 202 may request the token manager 204 to generate, update, and discard a key token, respectively, when the policy is input, changes, and expires. Specifically, when a new policy is input or the input policy is changed, the policy manager 202 may request the token manager 204 to generate or update a key token, and when a validity period of the input policy has expired, may request the token manger 204 to discard a key token.

The token manager 204 manages the generation, update, and discard of the key token. The token manager 204 may generate the key token as the policy is input through the policy manger 202. In addition, the token manager 204 may update or discard one or more of the key token and the maximum count in consideration of one or more of a validity period of the key token, the value of the maximum count in the first device 104, and the policy input to the server 102. That is, the token manager 204 may manage a life cycle of the key token dependent on the input policy.

In addition, the token manager 204 may generate a hash code based on the generated key token. Specifically, the token manger 204 may generate a plurality of first hash values by repeatedly hashing the key token as many times as the set maximum count, and generate a chain of the first hash values by sequentially connecting the first hash values in order of the number of times by which a hash function is applied. In this case, the maximum count is the number of sequentially connected first hash values, and may vary according to the input policy and the validity period of the key token. In addition, the token manager 204 may update the hash code when the key token is updated, and may discard the hash code when the key token is discarded. In addition, the token manager 204 may synchronize chains of hash values stored in both the first and second devices 104 and 106 using values of the maximum count in each of the first device 104 and the second device 106.

The first device manager 206 transmits and receives data to and from the first device 104. The first device manager 206 may transmit the sequentially connected first hash values (i.e., the chain of the first hash values), the input policy, information about the maximum count, information about the validity period of the key token, and the like to the first device 104. In addition, the first device manager 206 may request the first device 104 to synchronize the hash code and receive the stored information about the maximum count from the first device 104. Further, the first device manager 206 may request the first device 104 to discard the hash code according to a request of the token manger 204.

The second device manager 208 transmits and receives data from and to the second device 106. The second device manager 208 may transmit an initial hash value of the key token, information about the maximum count, the input policy, information about the validity period of the key token, and the like to the second device 106. In addition, the second device manager 208 may request the second device 106 to synchronize the hash code and receive the stored information about the maximum count from the second device 106. In addition, the second device manager 208 may request the second device 106 to discard the hash code according to a request of the token manager 204.

The interface 210 is a module for transmitting and receiving data to and from the legacy system, the first device 104, and the second device 106. The policy manger 202 may receive a policy from the legacy system through the interface 210. In addition, the first device manager 206 may transmit and receive a variety of data from and to the first device 104 through the interface 210. Moreover, the second device manager 208 may transmit and receive data from and to the second device 106 through the interface 210. In this case, the second device manger 208 may transmit and receive a variety of data from and to the second device 106 via the relay device 108, and in this case, the interface 201 may be used in relaying the data between the server 102 and the relay device 108.

The command manager 212 manages various commands for controlling the second device 106. The command manager 212 may include one or more commands corresponding to the respective policies, and when a command for each of the policies needs to be modified, may update the command. The command for each of the policies may be mapped to the corresponding policy, and the first device 104 and the second device 106 may identify one or more commands corresponding to the received policy by referring to information about the policy received from the server 102. The command may be, for example, door-lock/unlock commands, power on/off commands, navigation information inquiry command, or location information inquiry command for a reserved vehicle.

The permission setting manager 214 manages information about a user provided with a service, information on the first device 104, and information on the second device 106. The permission setting manager 214 may register the information on the first and second devices 104 and 106. Here, the information on the first device 104 may be, for example, a type and identification information of the first device 104, an ID and password of a user who possesses the first device 104, or the like. In addition, the information on the second device 106 may be, for example, a type and identification information of the second device 106, information about controllable operations (e.g., door lock/unlock, power on/off, etc.) of the second device 106, or other information (e.g., if the second device 106 is a vehicle, navigation information, location information or the like of the vehicle.

The authentication manager 216 authenticates the first device 104 and the second device 106 in association with the permission setting manager 214. The authentication manager 216 may authenticate the first device and the second device, respectively, using the above-described information on the first device 104 and information on the second device 106 when there is a login request of the first device 104 and the second device 106 to access.

The database 218 is a repository in which a variety of information necessary for a D2D communication between the first device 104 and the second device 106 is stored. For example, one or more policies, commands for each of the policies, a token key, a hash code of the token key, the information on the first and second devices 104 and 106, and the like may be stored in the database 218. Although the database 218 is illustrated as being connected to the server 102 for convenience of description in FIG. 1, it is merely an example, and the database 218 may be inside the server 102 as one configuration of the server 102.

Figure 7:
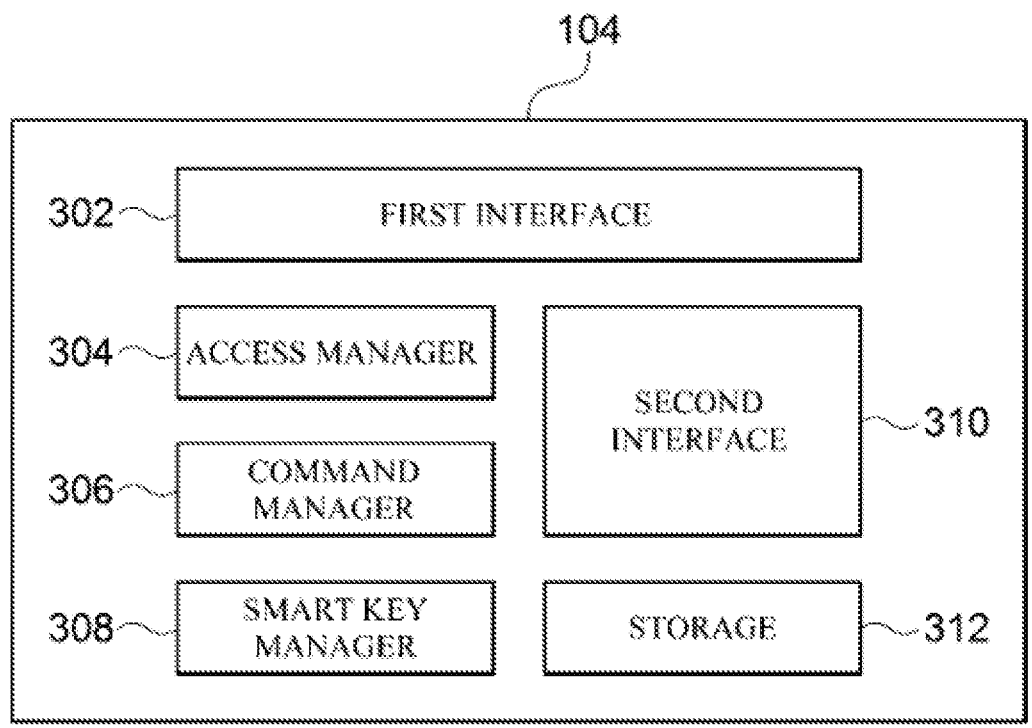
FIG. 7 is a block diagram illustrating a detailed configuration of a first device according to an exemplary embodiment of the present inventive concept.

FIG. 7 is a block diagram illustrating a detailed configuration of the first device 104 according to an exemplary embodiment of the present inventive concept. As shown in FIG. 7, the first device 104 includes a first interface 302, an access manager 304, a command manager 306, a smart key manager 308, a second interface 310, and a storage 312.

The first interface 302 is a module for transmitting and receiving data to and from the server 102. The first device 104 may transmit and receive a variety of data to and from the server 102 through the first interface 302.

The access manager 304 requests login to the server 102 according to a request of the user. In addition, when the access manager 304 may provide the information on the first device 104 to the server 102 and the server 102 may authenticate the first device 104 using the information on the first device 104 received from the access manager 304.

The command manager 306 manages various commands for controlling the second device 106. The command manager 306 may be provided with one or more commands corresponding to each of the policies and may transmit information about a command corresponding to the policy received from the server 102 to the second device 106 along with the policy.

The smart key manager 308 may receive the sequentially connected first hash values (i.e., a chain of the first hash values), the input policy, information about the first maximum count, information about the validity period of the key token, and the like from the server 102. In addition, the smart key manager 308 may transmit the sequentially connected first hash values to the second device 106 one at a time and after the first hash value is transmitted, the smart key manager 308 may delete the first hash value from the chain of the first hash values, thereby exhausting the first hash values one by one. That is, when the smart key manager 308 transmits a first hash value (i.e., $H^N(T)$) obtained by applying a hash function N times to the key token to the second device 106, the smart key manager 308 may delete the $H^N(T)$ from the chain and decrease the stored first maximum count from N to N-1.

In addition, when the number of the first hash values connected to the chain (or a value of the maximum count in the first device 104) is less than or equal to a set value of, for example, 1, when a set period or longer is left to the expiration of the validity period of the key token, the smart key manager 308 may request the server 102 to update the key token and the first maximum count.

The second interface 310 is a module for transmitting and receiving data to and from the second device 106. The first device 104 may transmit and receive a variety of data to and from the second device 106 through the second interface 310. The second interface 310 may be, for example, a wireless communication module, such as a Wi-Fi module, a Bluetooth low energy (BLE) module, a near-field communication (NFC) module, a ZigBee module, or the like.

The storage 312 is a repository in which a variety of information necessary for a D2D communication between the first device 104 and the second device 106. The first hash values, policy, and information about the first maximum count received from the server 102 may be stored in the smart key manager 308.

Figure 8:
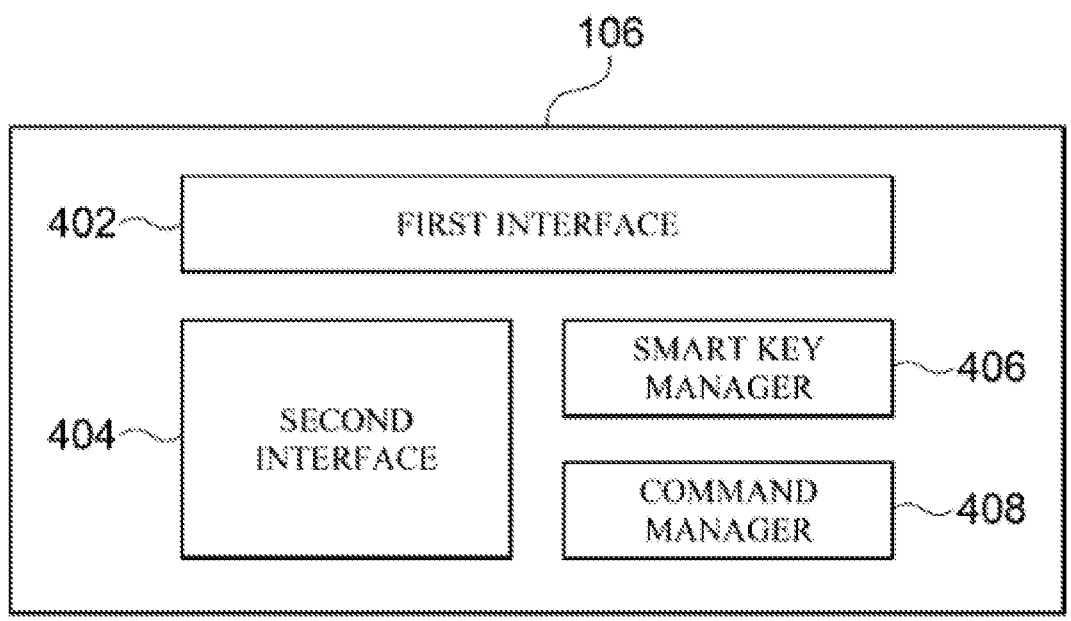
FIG. 8 is a block diagram illustrating a detailed configuration of a second device according to an exemplary embodiment of the present inventive concept.

FIG. 8 is a block diagram illustrating a detailed configuration of the second device 106 according to an exemplary embodiment of the present inventive concept. As shown in FIG. 8, the second device 106 includes a first interface 402, a second interface 404, a smart key manager 406, and a command manager 408.

The first interface 402 is a module for transmitting and receiving data to and from the server 102. The second device 106 may transmit and receive a variety of data to and from the server 102 through the first interface 402. In this case, the second device 106 may transit and receive a variety of data to and from the server 102 via the relay device 108, and in this case, the first interface 402 may be used in relaying the data between the second device 106 and the relay device 108.

The second interface 404 is a module for transmitting and receiving data to and from the first device 104. The second device 106 may receive a variety of data from the first device 104 through the second interface 404. The second interface 404 may be, for example, a wireless communication module, such as a Wi-Fi module, a BLE module, an NFC module, or a ZigBee module.

The smart key manager 406 receives an initial hash value of a key token, information on the second maximum count, an input policy, information about a validity period of the key token, and the like from the server 102. In addition, the smart key manager 406 may receive one of the first hash values from the first device 104 and authenticate the first device 104 using the first hash value received from the first device 104, the initial hash value received from the server 102, and the information about the second maximum count.

Specifically, the smart key manager 406 may authenticate the first device 104 by comparing the received first hash values with each of the second hash values generated by repeatedly hashing the initial hash value a number of times up to the value of the second maximum count until a value identical to the first hash value received from the first device 104 appears.

In addition, the smart key manager 406 may decrease the second maximum count based on the second hash value identical to the first hash value. In one example, when a second hash value obtained by hashing the initial hash value N times is identical to the first hash value, the smart key manger 406 may decrease the second maximum count to N.

The command manager 408 may execute a command corresponding to the policy received from the first device 104 when the smart key manager 406 successfully authenticates the first device 104. In one example, when the first hash value received from the first device 104 is identical to the second hash value generated by the second device 106, the command manager 408 may unlock the door lock of the vehicle.

Figure 9:
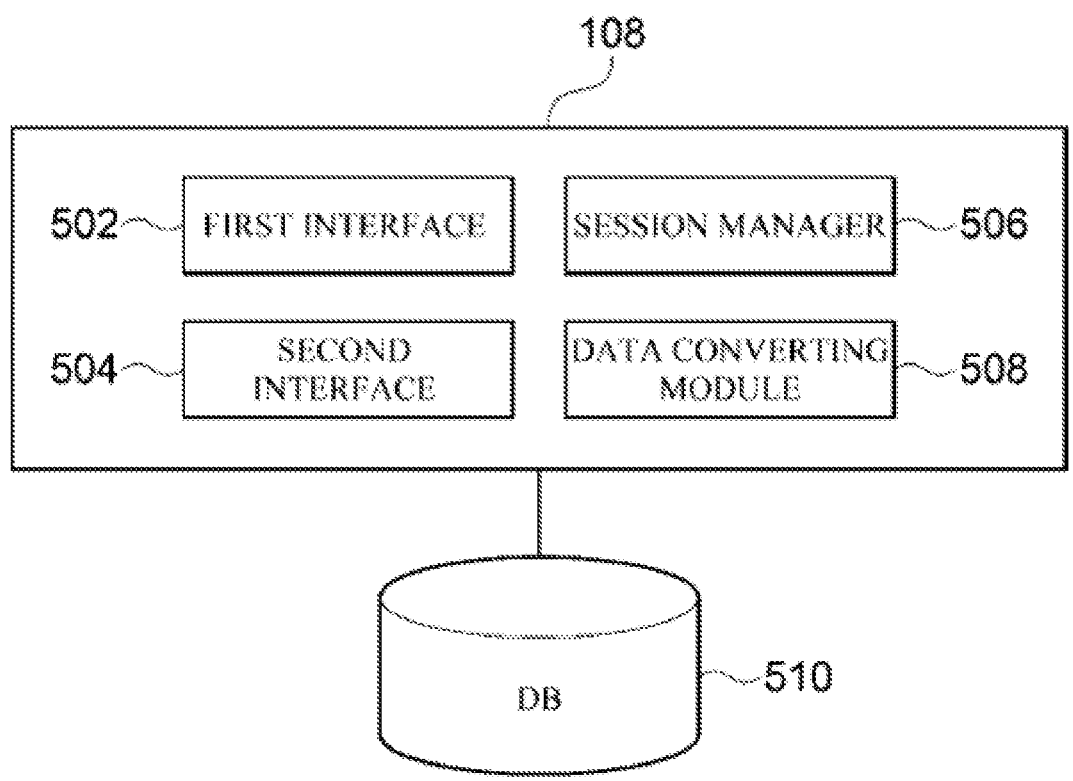
FIG. 9 is a block diagram illustrating a detailed configuration of a relay device according to an exemplary embodiment of the present inventive concept.

FIG. 9 is a block diagram illustrating a detailed configuration of the relay device 108 according to an exemplary embodiment of the present inventive concept. As shown in FIG. 9, the relay device 108 includes a first interface 502, a second interface 504, a session manager 506, and a data converting module 508, and may be connected to a database 510 according to an embodiment.

The first interface 502 is a module for transmitting and receiving data to and from the server 102. The relay device 108 may transmit and receive a variety of data to and from the server 102 through the first interface 502.

The second interface 504 is a module for transmitting and receiving data to and from the second device 106. The relay device 108 may transmit and receive a variety of data to and from the second device 106 through the second interface 504. In addition, the relay device 108 may support, for example, a message queuing telemetry transport (MQTT)

protocol and may transmit and receive a variety of data to and from the second device 106 through the MQTT protocol.

The session manager 506 manages session information of the second device 106.

The data converting module 508 converts the data received from the server 102 into a form receivable by the second device 106, or convert the data received from the second device into a form receivable by the server 102.

The database 510 is a repository in which a variety of information necessary for a communication between the server 102 and the second device 106. For example, the information of the second device 106, session information (e.g., session ID, etc.) and the like may be stored in the database 510.

Figure 10:
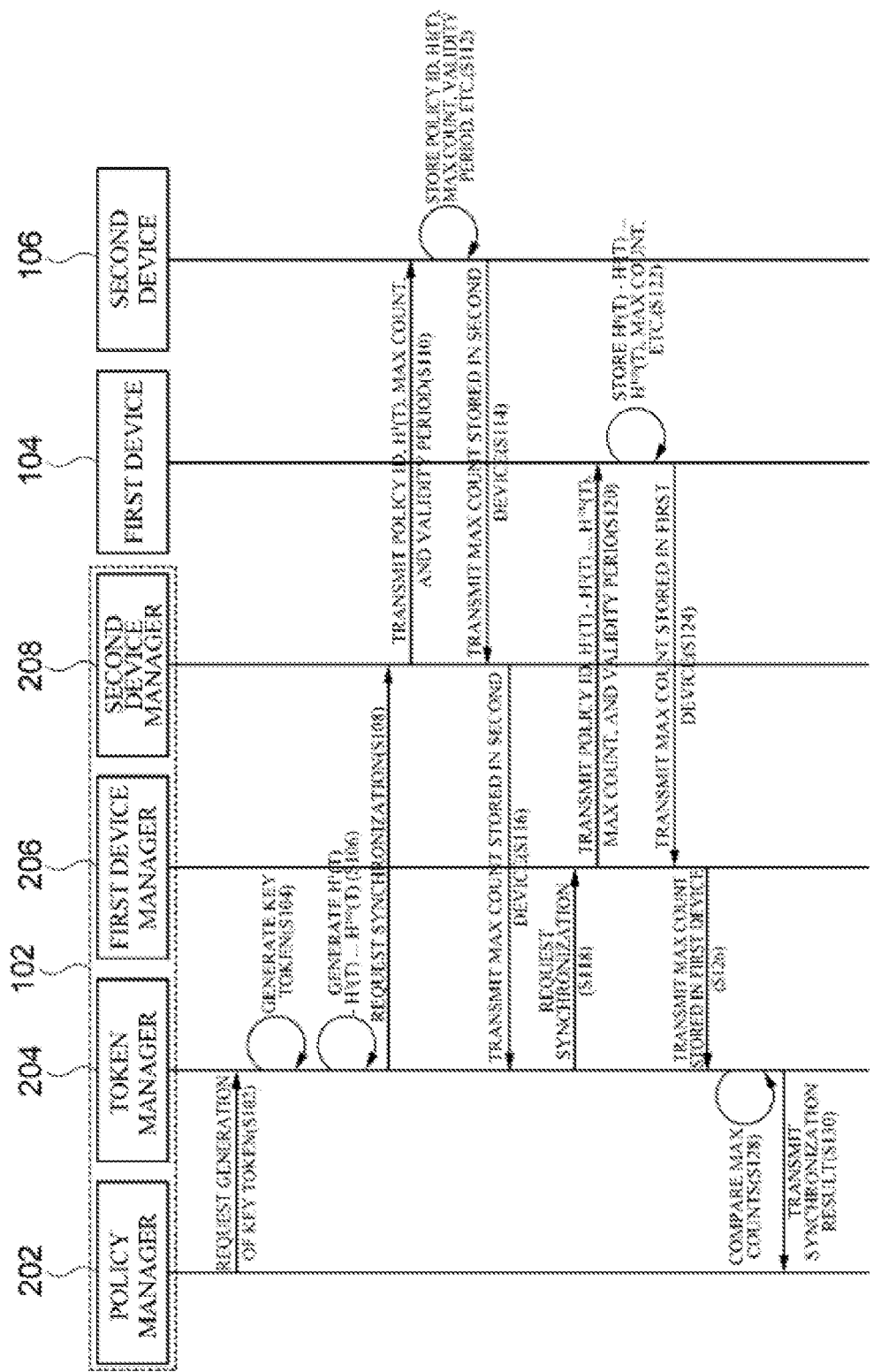
FIG. 10 is a flowchart illustrating a process of generating a key token and distributing a hash code according to an exemplary embodiment of the present inventive concept.

FIG. 10 is a flowchart illustrating a process of generating a key token and distributing a hash code according to an exemplary embodiment of the present inventive concept. In flowcharts of FIGS. 6 to 12, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation S102, a policy manager 202 requests a token manger 204 to generate a key token T according to an input of a policy.

In operation S104, the token manager 204 generates the key token T.

In operation S106, the token manager 204 sequentially connects first hash values in order of the number of times by which a hash function is applied wherein the first hash values are obtained by repeatedly hashing the key token T (or an initial hash value of the key token T) as many times as a set maximum count. In this case, for convenience of description, it is assumed that the maximum count is 100.

In operation S108, the token manager 204 requests a second device manager 208 to synchronize the hash code.

In operation S110, the token manager 204 searches for a second device 106 and requests hash code synchronization while transmitting an initial hash value of the key token, information about the maximum count, the input policy, information about a validity period of the key token, and the like to the second device 106.

In operation S112, the second device 106 stores the initial hash value of the key token, the information about the maximum count, the input policy, the information about the validity period of the key token, and the like. In this case, the maximum count stored in the second device 106 will be referred to as a second maximum count.

In operation S114, the second device 106 transmits information (e.g., Max count=100) about the second maximum count stored in the second device 106 to a second device manager 208.

In operation S116, the second device manager 208 transmits the information about the second maximum count (e.g., Max count=100) received from the second device 106 to the token manager 204.

In operation S118, the token manager 204 requests a first device manager 206 to synchronize the hash code.

In operation S120, the first device manager 206 searches for the first device 104 and requests hash code synchronization while transmitting sequentially connected first hash values (i.e., a chain of the first hash values), the input policy, information about the maximum count, information about the validity period of the key token, and the like to the first device 104.

In operation S122, the first device 104 encrypts and stores the sequentially connected first hash values (i.e., a chain of the first hash values), the input policy, the information about the maximum count, the information about the validity period of the key token, and the like. In this case, the maximum count stored in the first device 104 will be referred to as a first maximum count.

In operation S124, the first device 104 transmits information about the first maximum count (e.g., Max Count=100) stored in the first device 104 to the first device manager 206.

In operation S126, the first device manager 206 transmits the information about the first maximum count (e.g., Max Count=100) received from the first device 104 to the token manager 204.

In operation S128, the token manager 204 compares the first maximum count (e.g., Max Count=100) received from the first device 104 with the second maximum count (e.g., Max Count=100) received from the second device 106. When the first maximum count (e.g., Max Count=100) received from the first device 104 is identical to the second maximum count (e.g., Max Count=100) received from the second device 106, the token manager 204 determines that the hash code synchronization is successfully carried out. In contrast, when the first maximum count received from the first device 104 is not identical to the second maximum count received from the second device 106, the token manager 204 may determine that the hash code synchronization fails, and may re-request the first device manager 204 and the second device manager 206 to synchronize the hash code.

In operation S130, the token manger 204 transmits a hash code synchronization result to the policy manager 202.

Meanwhile, in the above description, the server 102 is described as synchronizing the hash codes stored in the first device 104 and the second device 106 in the course of distributing the hash code to each of the first device 104 and the second device 106, but it is merely an example. The server 102 may perform the above-described synchronization process at any time after the hash code is distributed to each of the first device 104 and the second device 106.

Figure 11:
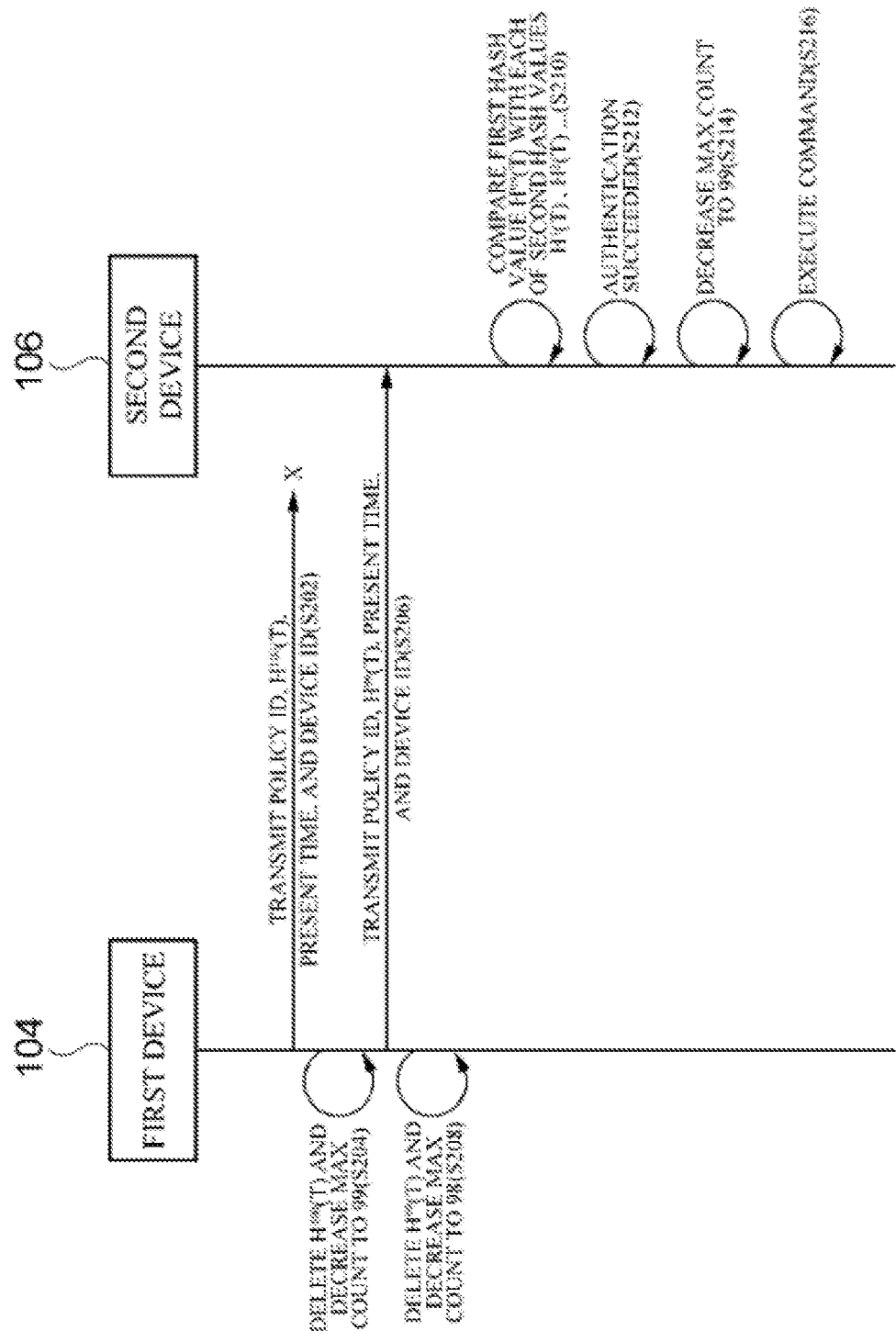
FIG. 11 is a flowchart illustrating a process of authentication between devices according to a first exemplary embodiment of the present inventive concept.

FIG. 11 is a flowchart illustrating a process of authentication between devices 104 and 106 according to a first exemplary embodiment of the present inventive concept.

In operation S202, a first device 104 transmits a first hash value corresponding to a first maximum count among a plurality of first hash values. In this case, it is assumed that the first maximum count is, for example, 100. The first device 104 may transmit $H^{100}(T)$, which is a first hash value corresponding to the first maximum value among the plurality of first hash values, to a second device 106 along with an input policy, a present time, an ID of the first device 104, and the like. In this case, it is assumed that it fails to transmit $H^{100}(T)$ to the second device 106 due to a network problem or the like.

In operation S204, the first device 104 deletes the transmitted first hash value, i.e., $H^{100}(T)$, from a chain of the first hash values and decreases the first maximum count stored in the first device 104 from 100 to 99. That is, when the first device 104 transmits a first hash value (i.e., $H^{N}(T)$) obtained by applying a hash function N times to the second device 106, the first device 104 may delete $H^{N}(T)$ from the above-described chain and decrease the first maximum count from N to N−1.

In operation S206, the first device 104 transmits the first hash value corresponding to the first maximum count among the first hash values. In this case, since the first maximum count is 99, the first device 104 may transmit the first hash value, $H^{99}(T)$, corresponding to the first maximum count to the second device 106 along with the input policy, a present time, the ID of the first device 104, and the like. In this case, it is assumed that $H^{99}(T)$ is successfully transmitted to the second device 106.

In operation S208, the first device 104 deletes the transmitted first hash value, i.e., $H^{99}(T)$ from the chain of the first hash values and decreases the first maximum count stored in the first device 104 from 99 to 98.

In operation S210, the second device 106 may authenticate the first device 104 by comparing the received first hash value with each of the second hash values generated by repeatedly hashing the initial hash value a number of times up to the value of the second maximum count until a value identical to the received first hash value appears. In one example, the second device 106 may compare the first hash value $H^{99}(T)$ with each of a second hash value $H^1(T)$, a second hash value $H^2(T)$, a second hash value $H^3(T)$, and so on. In this case, the second device 106 may repeatedly hash the initial hash value a number of times up to the value of the second maximum count until a value identical to the first hash value appears.

In operation S212, when a second hash value identical to the first hash value appears, the second device 106 determines that the first device 104 is successfully authenticated.

In operation S214, when a second hash value obtained by hashing the initial hash value N times is identical to the first hash value, the second device 106 decreases the second maximum value to N. In the above example, since the second hash value obtained by hashing the initial hash value 99 times, i.e., $H^{99}(T)$, is identical to the first hash value $H^{99}(T)$, the second device 106 may decrease the second maximum count from 100 to 99.

In operation S216, the second device 106 executes a command corresponding to the policy received from the first device 104.

Figure 12:
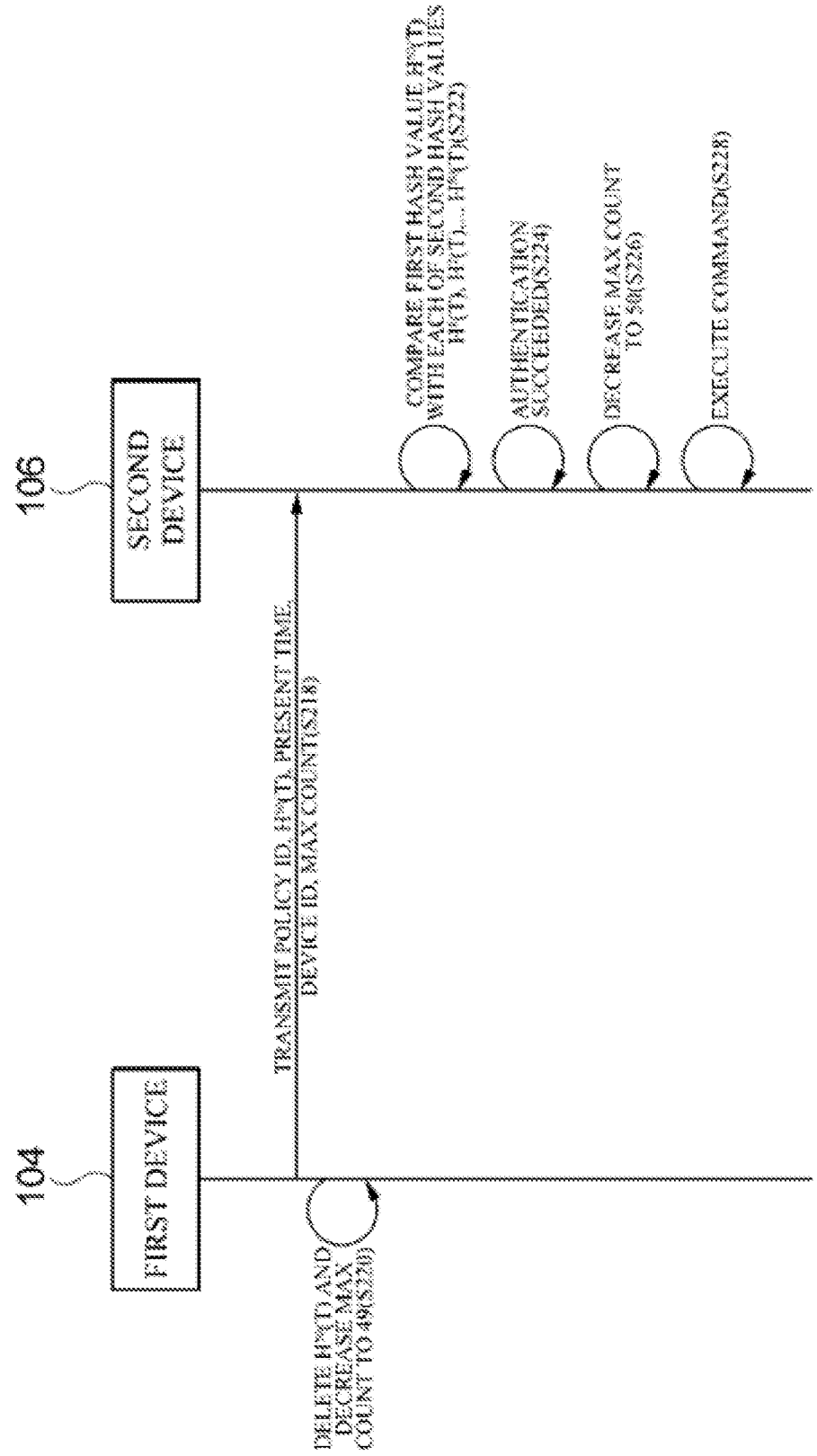
FIG. 12 is a flowchart illustrating a process of authentication between devices according to a second exemplary embodiment of the present inventive concept.

FIG. 12 is a flowchart illustrating a process of authentication between devices according to a second exemplary embodiment of the present inventive concept.

In operation S218, a first device 104 transmits a first hash value and a hash number M corresponding to the first hash value to a second device 106. In this case, the hash number M represents the number of times by which a hash function is applied. In one example, the first device 104 may transmit a first hash value $H^{50}(T)$ and a hash number M=50 that corresponds to the first hash value $H^{50}(T)$ to a second device 106.

In operation S220, the first device 104 deletes the transmitted first hash value, i.e., $H^{50}(T)$ from a chain of the first hash values and decreases a first maximum count stored in the first device 104 from 50 to 49.

In operation S222, the second device 106 compares the received first hash value with each of the second hash values generated by repeatedly hashing an initial hash value as many times as the hash number M. In this case, the second device 106 may check whether the hash number M is less than a second maximum count. In one example, when the hash number M is 50 and the second maximum count is 51, the second device 106 may confirm that the hash number M, 50, is less than the second maximum count, 51. In this case, the second device 106 may compare the first hash value $H^{50}(T)$ with each of a second hash value $H^1(T)$, a second hash value $H^2(T)$, a second hash value $H^3(T)$, . . . and a second hash value $H^{50}(T)$.

In operation S224, when there is a second hash value identical to the first hash value, the second device 106 determines that the first device 104 is successfully authenticated.

In operation S226, when a second hash value obtained by hashing the initial hash value N times is identical to the first hash value, the second device 106 decreases the second maximum count to N. In the above example, since the second hash value $H^{50}(T)$ hashed 50 times is identical to the first hash value $H^{50}(T)$, the second device 106 may decrease the second maximum count from 51 to 50.

In operation S228, the second device 106 executes a command corresponding to a policy received from the first device 104.

Figure 13:
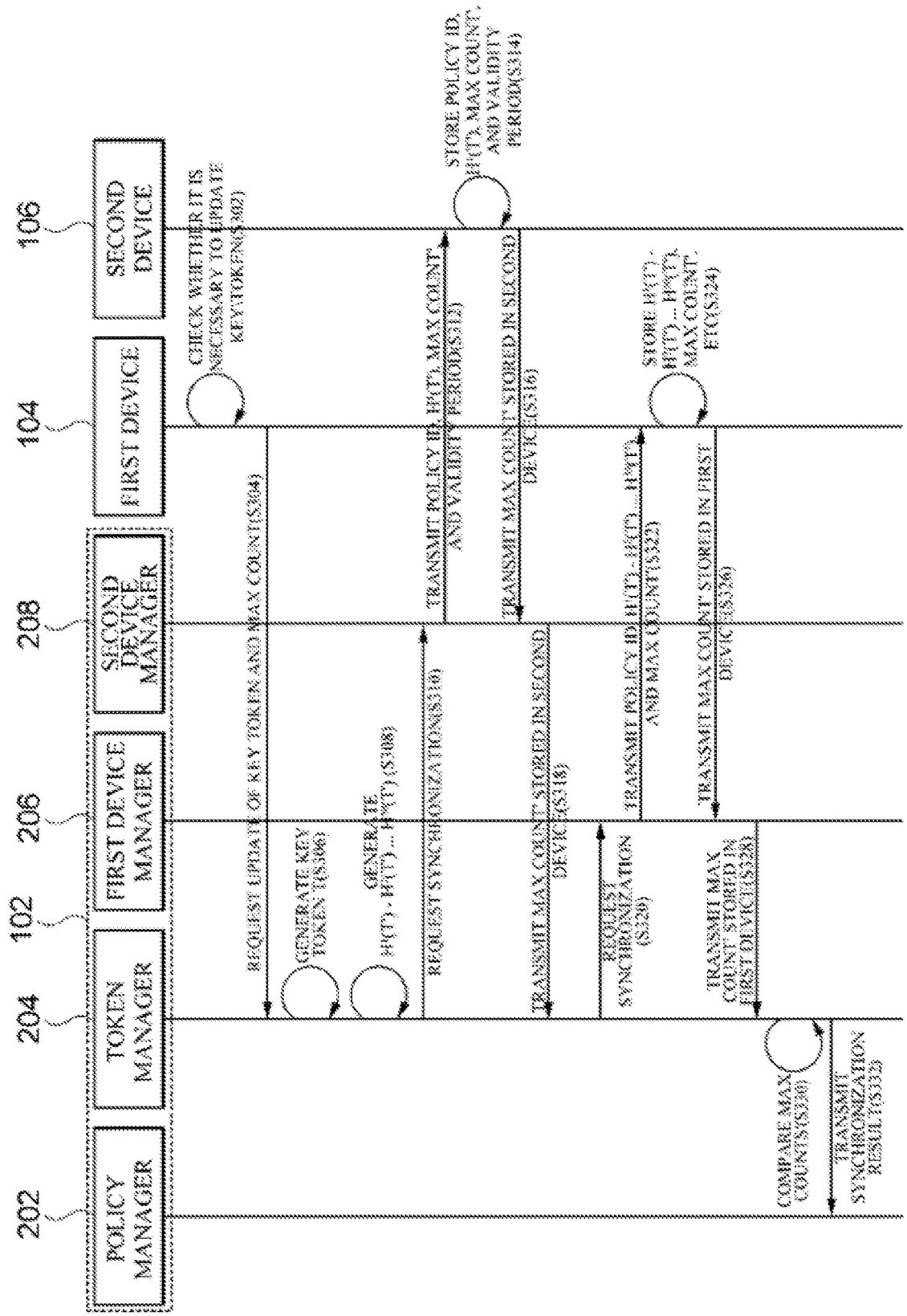
FIG. 13 is a flowchart for describing a process of updating a key token according to the first exemplary embodiment of the present inventive concept.

FIG. 13 is a flowchart for describing a process of updating a key token according to the first exemplary embodiment of the present inventive concept.

In operation S302, a first device 104 checks whether a key token generated in a server 102 needs to be updated. In one example, when the number of first hash values connected to a chain (or a value of the maximum count stored in the first device 104) is less than or equal to a set value of, for example, 1, when a set period or longer is left to the expiration of a validity period of the key token, the first device 104 may determine that the key token needs to be updated.

In operation S304, the first device 104 requests a token manager 204 to update the key token and the maximum count.

In operation S306, the token manager 204 generates a new key token T'.

In operation S308, the token manager 204 sequentially connects first hash values in order of the number of times by which a hash code is applied wherein the first hash values are obtained by repeatedly hashing the key token T' as many times as the set maximum count (e.g., Max Count'=50). In this case, for convenience of description, the updated maximum count is assumed as 50.

In operation S310, the token manager 204 requests a second device manager 208 to synchronize hash code.

In operation S312, the token manager 204 searches for a second device 106 and requests the hash code synchronization while transmitting an initial hash value of the updated key token T', information about the updated maximum count, an input policy, information about a validity period of the updated key token T', and the like to the second device 106.

In operation S314, the second device 106 stores the initial hash value of the key token T', the information about the updated maximum count, the input policy, the information about the validity period of the updated key token T', and the like. In this case, the updated maximum count stored in the second device 106 will be referred to as an updated second maximum count.

In operation S316, the second device 106 transmits information (e.g., Max Count'=50) about the second maximum count stored in the second device 106 to the second device manager 208.

In operation S318, the second device manager 208 transmits the information (e.g., Max Count'=50) about the second maximum count received from the second device 106 to the token manager 204.

In operation S320, the token manager 204 requests the first device manager 206 to synchronize hash code.

In operation S322, the first device manager 206 searches for the first device 104 and requests the hash code synchronization while transmitting the sequentially connected first hash values (i.e., a chain of the first hash values), the input policy, the information about the updated maximum count, the information about the validity period of the updated key token T', and the like to the first device 104.

In operation S324, the first device 104 encrypts and stores the sequentially connected first hash values (i.e., the chain of the first hash values), the input policy, the information about the updated maximum count, the information about the validity period of the updated key token T', and the like. In this case, the updated maximum count stored in the first device 104 will be referred to as an updated first maximum count.

In operation S326, the first device 104 transmits the information about the first maximum count (e.g., Max Count'=50) stored in the first device 104 to the first device manager 206.

In operation S328, the first device manager 206 transmits the information (e.g., Max Count'=50) about the first maximum count received from the first device 104 to the token manager 204.

In operation S330, the token manager 204 compares the information (e.g., Max Count'=50) about the first maximum count received from the first device 104 with the information (e.g., Max Count'=50) about the second maximum count received from the second device 106. When the information (e.g., Max Count'=50) about the first maximum count received from the first device 104 is identical to the information (e.g., Max Count'=50) about the second maximum count received from the second device 106, the token manager 204 determines that the hash code synchronization is successfully carried out.

In operation S332, the token manger 204 transmits a hash code synchronization result to a policy manager 202.

Operations S302 and S304 are described as being performed by the first device 104, but the aspects of the inventive concept of the present inventive concept are not limited thereto, and operations S302 and S304 may be performed by the second device 106 according to an embodiment.

Figure 14:
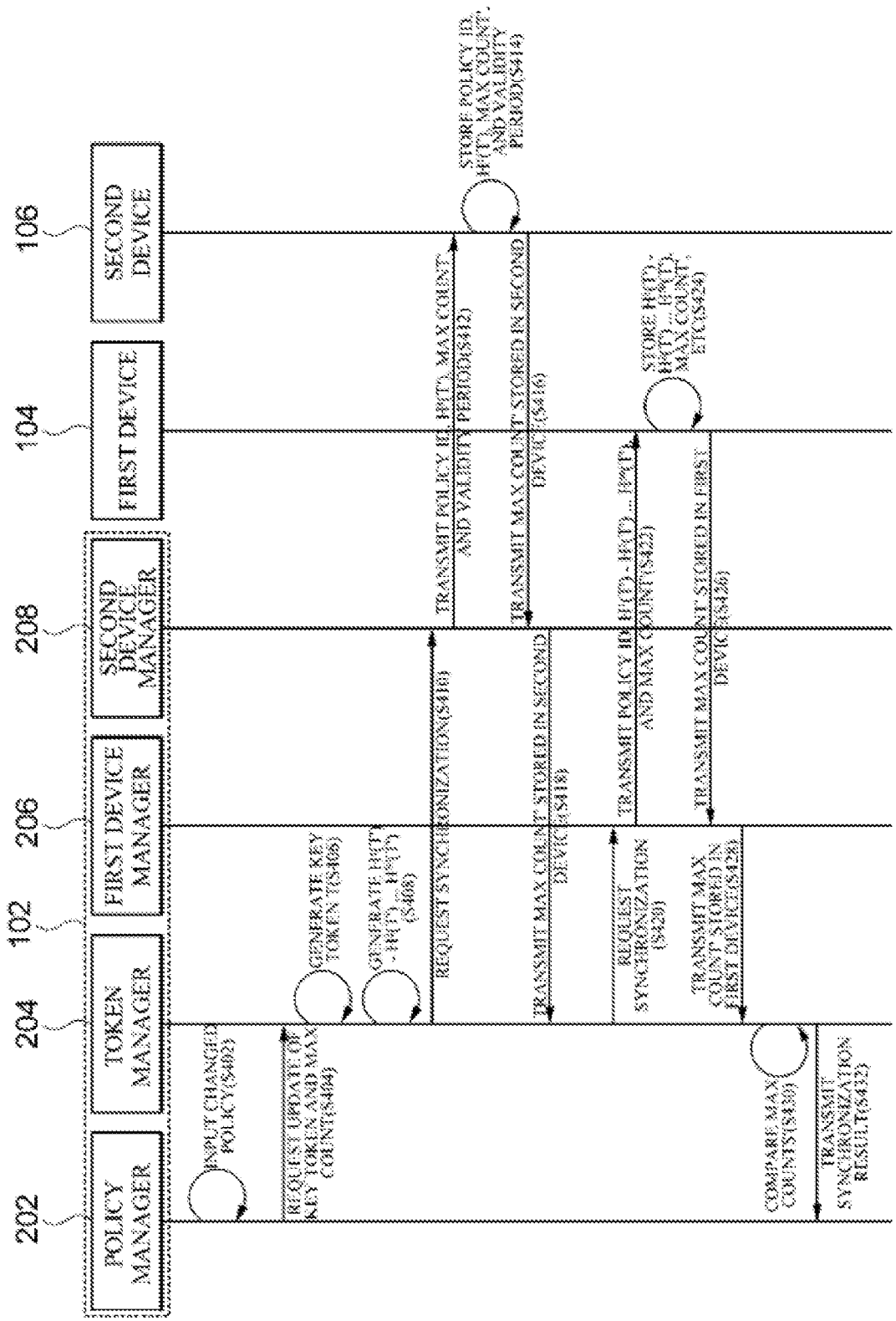
FIG. 14 is a flowchart illustrating a process of updating a key token according to the second exemplary embodiment of the present inventive concept.

FIG. 14 is a flowchart illustrating a process of updating a key token according to the second exemplary embodiment of the present inventive concept.

In operation S402, a policy manager 202 receives a changed policy from a legacy system.

In operation S404, the policy manager 202 requests a token manager 204 to update a key token and the maximum count according to the change of policy.

Thereafter, operations S406 to S432 are performed. Since operations S406 to S432 are the same as operations S306 to S332, detailed descriptions thereof will be omitted.

Figure 15:
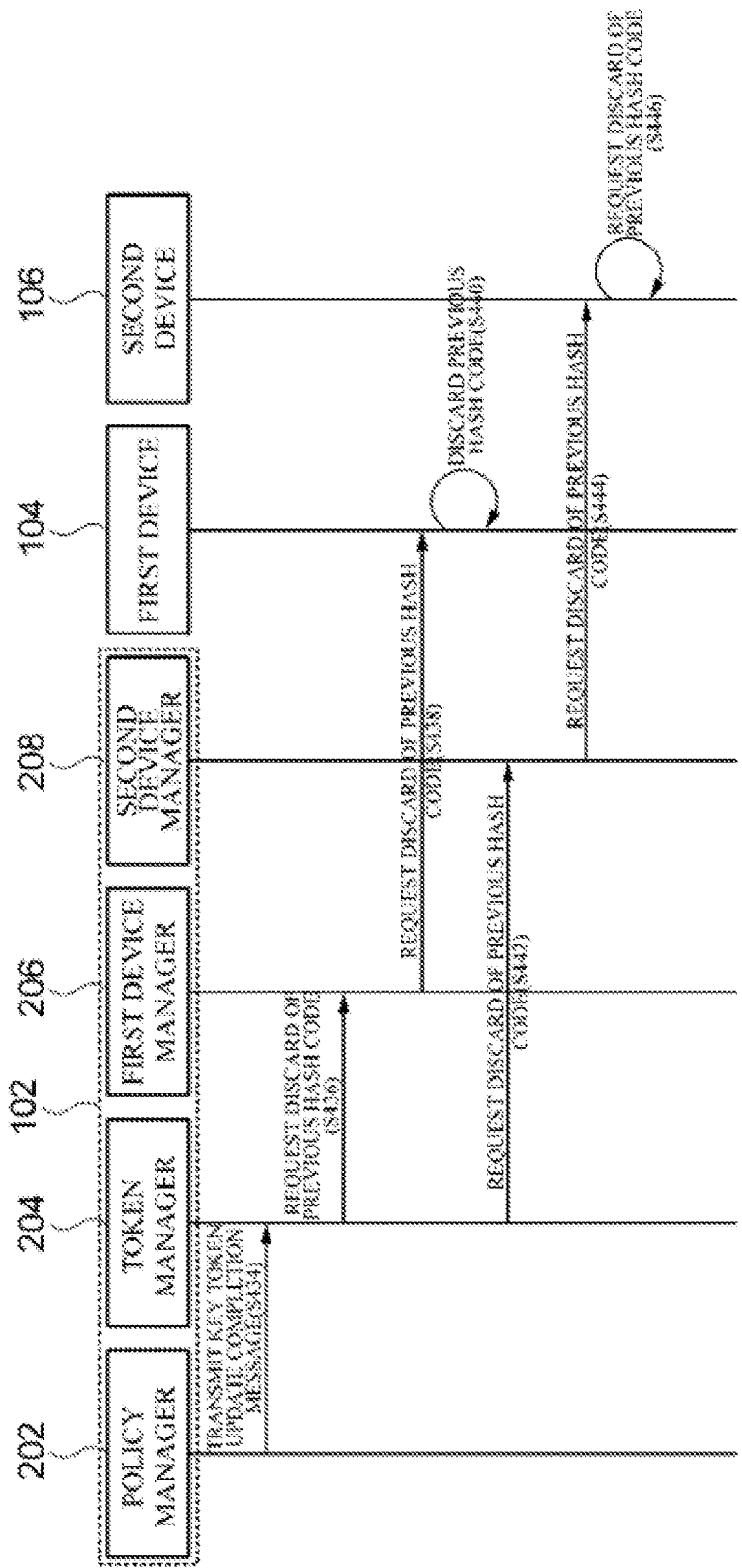
FIG. 15 is a flowchart for describing a process of discarding a previous key token according to the update of the key token in FIG. 14.

FIG. 15 is a flowchart for describing a process of discarding a previous key token according to the update of the key token in FIG. 14.

In operation S434, the policy manager 202 transmits a key token update completion message to the token manager 204.

In operation S436, the token manager 204 request the first device manager 206 to discard previous hash code stored in the first device 104.

In operation S438, the first device manager 206 requests the first device 104 to discard the previous hash code stored in the first device 104.

In operation S440, the first device 104 discards the previous hash code stored in the first device 104.

In operation S442, the token manager 204 requests the second device manager 208 to discard previous hash code stored in the second device 106.

In operation S444, the second device manager 208 requests the second device 106 to discard the previous hash code stored in the second device 106.

In operation S446, the second device 106 discards the previous hash code stored in the second device 106.

Figure 16:
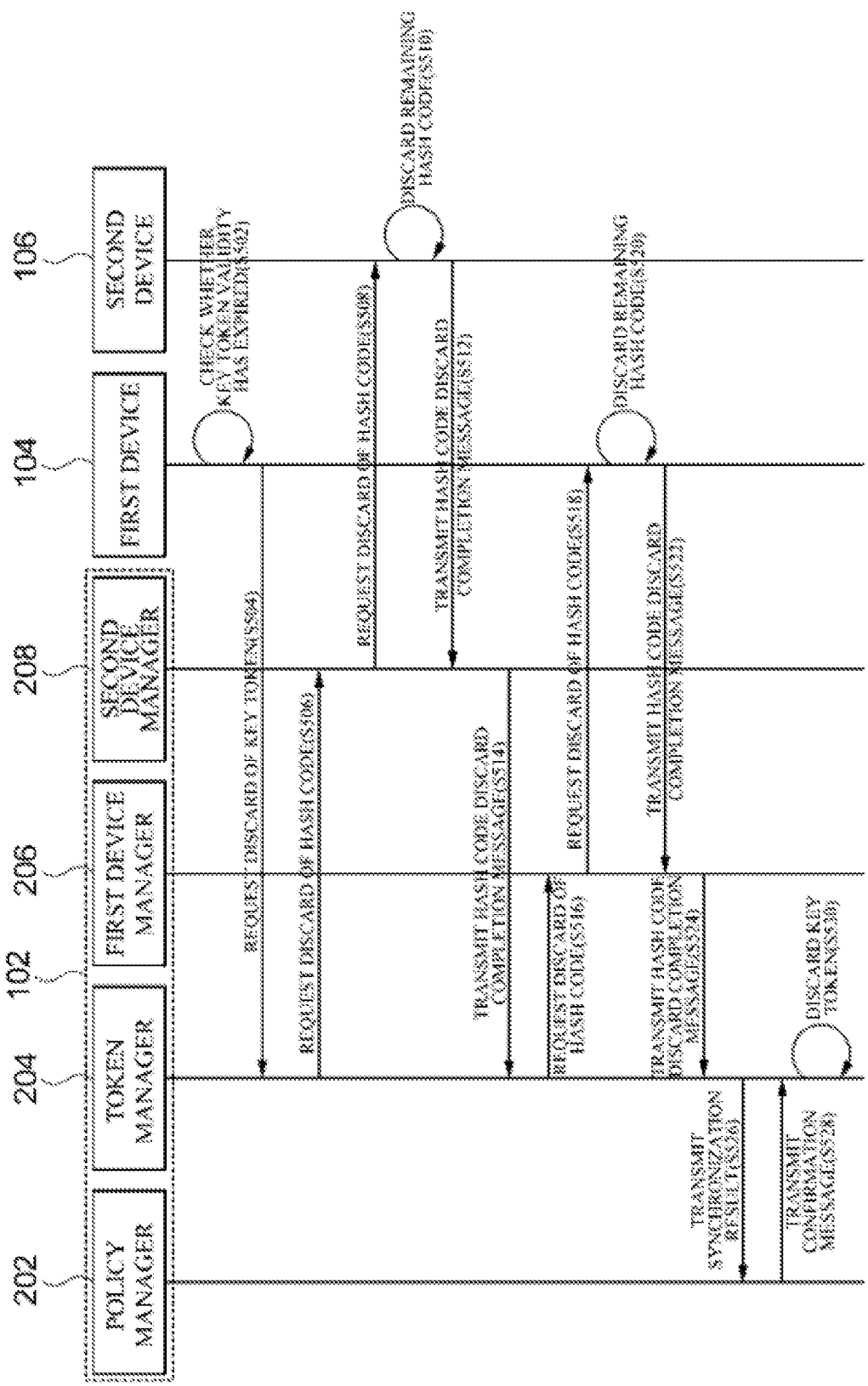
FIG. 16 is a flowchart for describing a process of discarding a key token according to the first exemplary embodiment of the present inventive concept.

FIG. 16 is a flowchart for describing a process of discarding a key token according to the first exemplary embodiment of the present inventive concept.

In operation S502, the first device 104 checks whether validity of a key token generated in the server 102 has expired. In one example, if the value of the maximum count stored in the first device 104 is less than or equal to a set value of, for example, 1, when a set period or longer is left to the expiration of a validity period of the key token, the first device 104 may determine that it is necessary to discard the key token.

In operation S504, the first device 104 requests the token manager 204 to discard the key token.

In operation S506, the token manager 204 requests the second device manager 208 to discard hash code stored in the second device 106.

In operation S508, the second device manager 208 requests the second device 106 to discard remaining hash code stored in the second device 106.

In operation S510, the second device 106 discards the remaining hash code stored in the second device 106.

In operation S512, the second device 106 transmits a hash code discard completion message to the second device manager 208.

In operation S514, the second device manager 208 transmits the hash code discard completion message received from the second device 106 to the token manager 204.

In operation S516, the token manager 204 requests the first device manager 206 to discard hash code stored in the first device 104.

In operation S518, the first device manager 206 requests the first device 104 to discard the remaining hash code stored in the first device 104.

In operation S520, the first device 104 discards the remaining hash code stored in the first device 104.

In operation S522, the first device 104 transmits a hash code discard completion message to the first device manager 206.

In operation S524, the first device manager 206 transmits the hash code discard completion message received from the first device 104 to the token manager 204.

In operation S526, the token manager 204 transmits a hash code synchronization result to the policy manager 202.

In operation S528, the policy manager 202 transmits a confirmation message with respect to the synchronization result to the token manager 204.

In operation S530, the token manager 204 discards a key token stored in the server 102.

Meanwhile, in the present embodiment, operations S502 and S504 are described as being performed by the first device 104, but aspects of the inventive concept of the present inventive concept are not limited thereto, and operations S502 and S504 may be performed by the second device 106 according to an embodiment.

Figure 17:
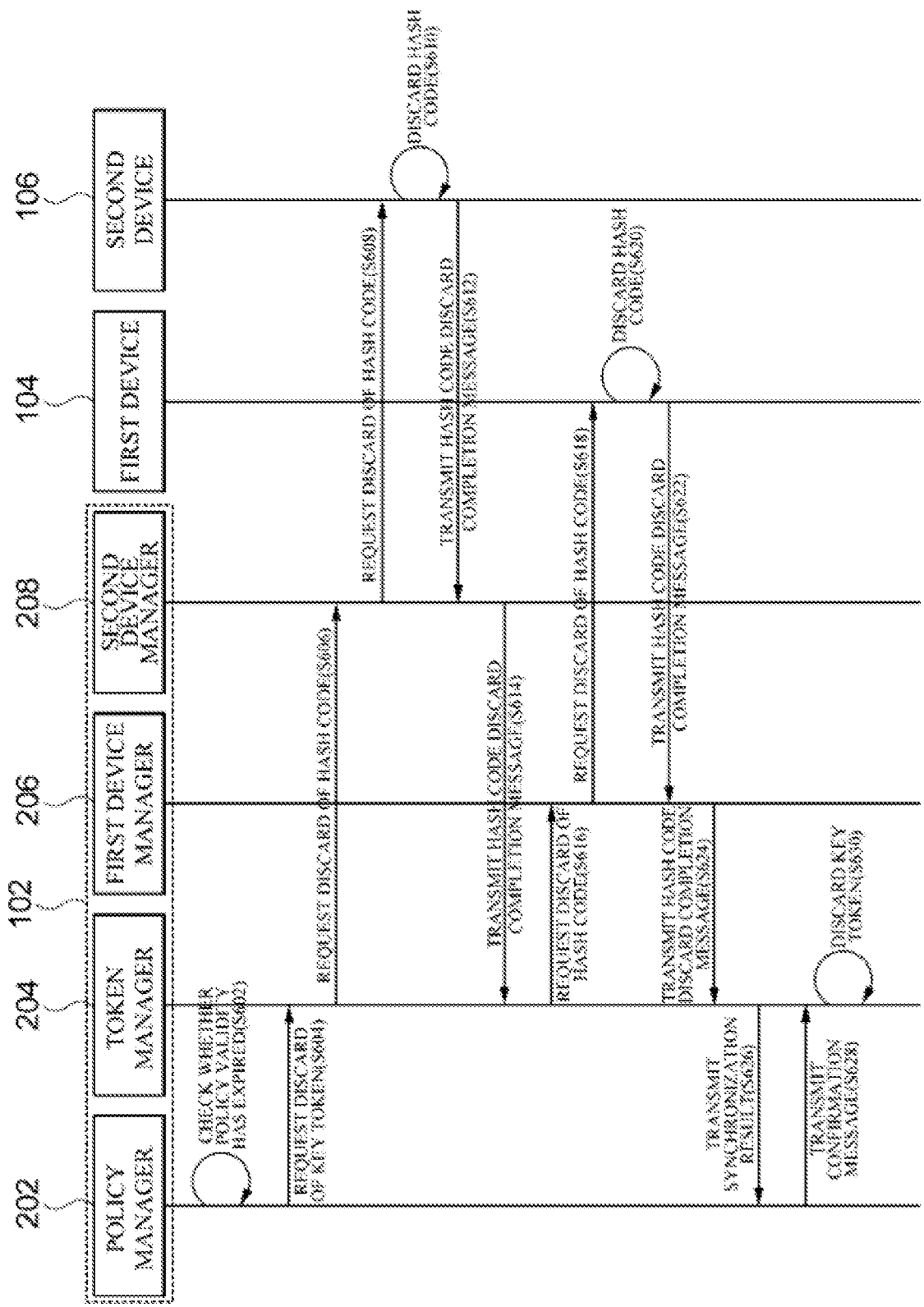
FIG. 17 is a flowchart for describing a process of discarding a key token according to the second exemplary embodiment of the present inventive concept.

FIG. 17 is a flowchart for describing a process of discarding a key token according to the second exemplary embodiment of the present inventive concept.

In operation S602, the policy manager 202 checks whether validity of an input policy has expired. In one example, when a validity period of the input policy or a key token has expired, the policy manager 202 may determine that it is necessary to discard the key token.

In operation S604, the policy manager 202 requests the token manager 204 to discard the key token.

Thereafter, operations S606 to S630 are performed. Operations S606 to S630 are the same as operations S506 to S530 described above, and hence detailed descriptions thereof will be omitted. Meanwhile, in the present embodiment, it is described that the server 102 discards the key token when the validity of the key token or the input policy has expired, but aspects of the inventive concept of the present inventive concept are not limited thereto. For example, the server 102 may discard the key token when the validity of the key token is lost, such as when malicious code is detected in the first device 104 or the second device 106, or when it is determined that a user's ID is falsified. In addition, the server 102 may discard the key token according to an enforcement action by an administrator.

Meanwhile, the above-described communication system 100 may be applied to various services, such as a vehicle reservation and control service, a door-lock control service, and the like. In one example, when the communication system 100 is applied to a vehicle reservation and control service, the first device 104 may be a user terminal carried by the user, for example a smartphone, and the second device 106 may be a security module mounted in the vehicle, for example, a crypto service manager (CSM).

In this case, the user may input a reservation request and reservation period for the use of the vehicle through a mobile application installed in the first device 104. The server 102 may receive information about the reservation request and reservation period from a legacy system (not shown) associated with the first device 104 and may generate a key token and the maximum count when the user's reservation for the vehicle is completed. At this time, a first maximum count and a second maximum count may be proportional to the user's reservation period for the vehicle. For example, when the user's reservation period is 5 days, the first maximum count and the second maximum count may each be 100. When the user's reservation period is 3 days, the first maximum count and the second maximum count may each be 50. In addition, when the user's reservation for the vehicle is changed, the server 102 may discard the generated key token and re-generate a new key token.

When the user's reservation for the vehicle is completed or the reservation is changed, the server 102 may transmit first hash values, a sequential connection relationship among the first hash values, and information about the first maximum count to the first device 104 and may transmit an initial hash value of the key token and information about the second maximum count to the second device 106. However, the key token and the maximum count are not necessarily generated in the server 102, and may be generated in the first device 104, the second device 106, or other elements.

In addition, when the user cancels the reservation for the vehicle, the server 102 may discard the generated key token and request each of the first device 104 and the second device 106 to discard the first hash values and second hash values.

Figure 18:
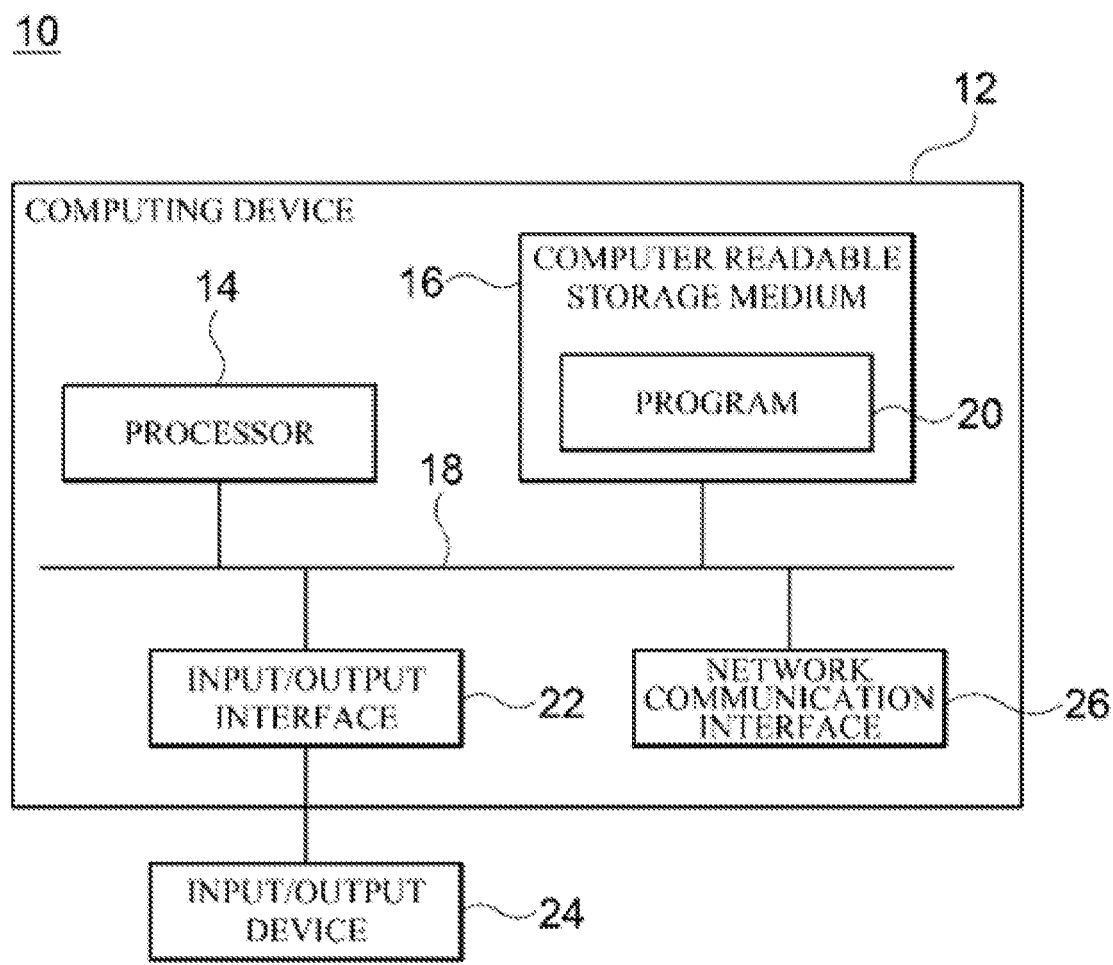
FIG. 18 is a block diagram for describing a computing environment including a computing device suitable to use in the illustrative embodiments.

FIG. 18 is a block diagram for describing a computing environment including a computing device suitable to use in the illustrative embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the server 102, the first device 104, the second device 106 or the relay device 108.

The computing device 12 includes at least one processor 12, a computer readable storage medium 16, and a communication bus 18. The processor 14 may cause the computing device 12 to operate according to the foregoing illustrative embodiments. For example, the processor 14 may execute one or more programs stored in the computer readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A device-to-device (D2D) communication method comprising:
    storing, by a first device, first authentication data including a hash chain, which is a sequential concatenation of hash values, and storing, by a second device, second authentication data including an initial hash value of the hash chain;
    transmitting, by the first device, a final hash value of the hash chain to the second device;
    determining, by the second device, whether authentication between the first and second devices has succeeded by repeatedly hashing the initial hash value stored in the second device until a hash value identical to the final hash value is returned;
    if a determination is made that authentication between the first and second devices has succeeded, performing, by the first and second devices, a connection establishment process for establishing a connection between the first and second devices;
    if a determination is made that authentication between the first and second devices has failed, transmitting, by the first device, another hash value of the hash chain to the second device;
    repeatedly hashing, by the second device, the initial hash value stored in the second device until a hash value identical to the another hash value is returned; and
    determining, by the second device, that authentication between the first and second devices has failed if a hash value identical to the another hash value is not returned,
    wherein the another hash value is different value from the final hash value.

2. The D2D communication method of claim 1, wherein
    the first authentication data further includes a maximum count,
    the final hash value is one of the hash values of the hash chain that offsets the maximum count,
    the maximum count is lowered by one whenever each of the hash values of the hash chain is transmitted from the first device to the second device,
    the first device issues a request for the update of a key token if the maximum count becomes less than or equal to a set value,
    in response to the request for the update of the key token, the key token is updated, and
    new hash chain obtained based on the updated key token is transmitted to the first device,
    the hash chain stored in the first device and the initial hash value stored in the second device is generated using the key token.

3. The D2D communication method of claim 2, wherein
the first authentication data further includes a maximum count,
    the final hash value is one of the hash values of the hash chain that offsets the maximum count,
    the maximum count is lowered by one whenever each of the hash values of the hash chain is transmitted from the first device to the second device,
    the first device issues a request for the discardment of a key token if the maximum count becomes less than or equal to a set value,
    in response to the request for the discardment of the key token, a request for the discardment of the hash chain is issued to the first device,
    the key token is discarded if the hash chain is discarded from the first device,
    the hash chain stored in the first device and the initial hash value stored in the second device is generated using the key token.

4. The D2D communication method of claim 1, wherein
the connection establishment process is a Bluetooth paring process,
    the storing, by the first device, the first authentication data including the hash chain and storing, by the second device, the second authentication data including the initial hash value of the hash chain, comprises receiving, by the first device, the hash chain from a service server and storing the hash chain, and
    the transmitting, by the first device, the final hash value of the hash chain to the second device, comprises transmitting, by the first device, a Bluetooth paring request signal including the final hash value to the second device.

5. The D2D communication method of claim 1, wherein
the storing, by the first device, the first authentication data including the hash chain and storing, by the second device, the second authentication data including the initial hash value of the hash chain, comprises receiving, by the first device, the first authentication data from a service server as a result of a reservation request issued by a user to the service server, storing, by the first device, the first authentication data, receiving, by the second device, the second authentication data from the service server, and storing, by the second device, the second authentication data,
    the determining whether authentication between the first and second devices has succeeded, comprises determining whether authentication between the first and second devices has succeeded without transmitting data to, or receiving data from, the service server, and
    the performing, by the first and second devices, the connection establishment process, comprises performing, by the first and second devices, the connection establishment process without transmitting data to, or receiving data from, the service server.

6. The D2D communication method of claim 5, wherein
the first authentication data further includes identifier (ID) information of the second device, and
    the transmitting, by the first device, the final hash value of the hash chain to the second device, comprises transmitting, by the second device, an advertising signal including the ID information of the second device, sensing, by the first device, the advertising signal, comparing, by the first device, the ID information included in the advertising signal with ID information included in the first authentication data, and transmitting, by the first device, the final hash value to the second device if the ID information included in the advertising signal matches the ID information included in the first authentication data.

7. The D2D communication method of claim 6, wherein
the reservation request includes information regarding a validity period,
    the second authentication data further includes the information regarding the validity period, and
    the transmitting, by the second device, an advertising signal including the ID information of the second device, comprises transmitting, by the second device, the advertising signal including the ID information of the second device, during the validity period.

8. The D2D communication method of claim 6, wherein
the reservation request includes information regarding a validity period,
the first authentication data further includes the information regarding the validity period, and
the sensing, by the first device, the advertising signal, comparing, by the first device, the ID information included in the advertising signal with ID information included in the first authentication data, and transmitting, by the first device, the final hash value to the second device if the ID information included in the advertising signal matches the ID information included in the first authentication data, comprises activating, by the first device, scanning for sensing the advertising signal, during the validity period.

9. The D2D communication method of claim 1, wherein the performing, by the first and second devices, the connection establishment process, comprises performing, by at least one of the first and second devices, a default process without a requirement of user input for the first device, if the connection establishment process succeeds.

10. The D2D communication method of claim 9, wherein
the second device is a device provided in a vehicle to control the vehicle, and
the performing, by at least one of the first and second devices, a default process without a requirement of user input for the first device, if the connection establishment process succeeds comprises, transmitting, by the second device, a control signal for opening doors of the vehicle and executing, by the first device, a vehicle control application that is based on D2D short-range wireless communication.

* * * * *